Aug. 26, 1969 R. E. CAMPBELL ET AL 3,463,367
PRESSING MACHINE
Filed Jan. 23, 1967 15 Sheets-Sheet 7
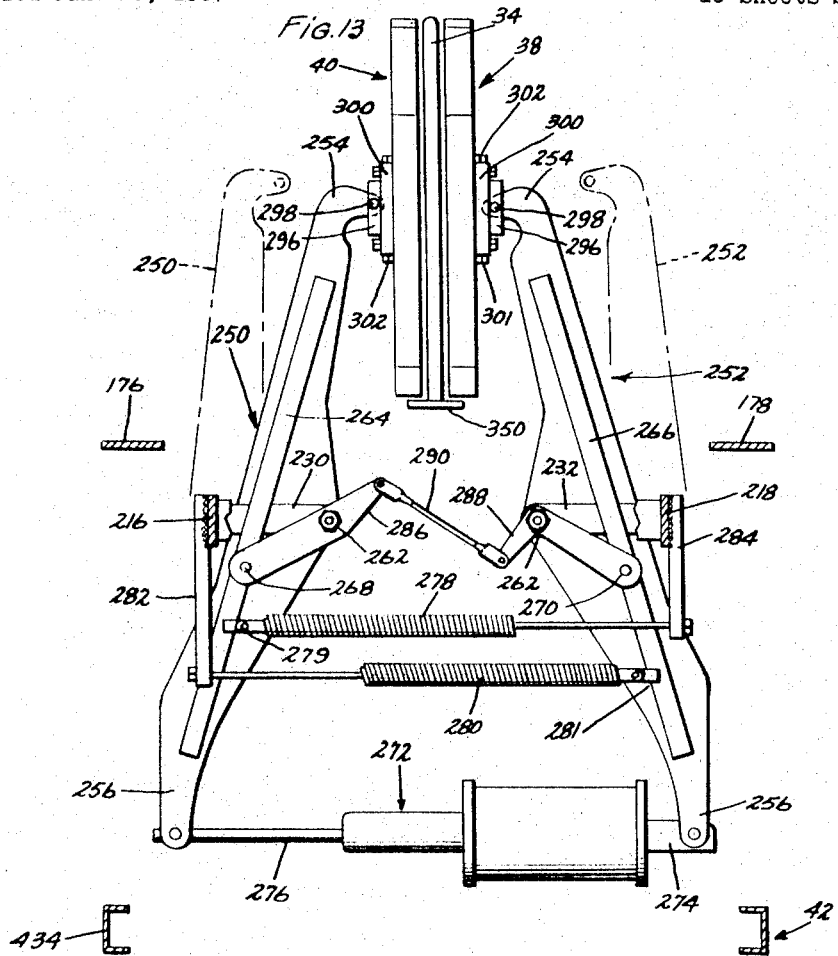
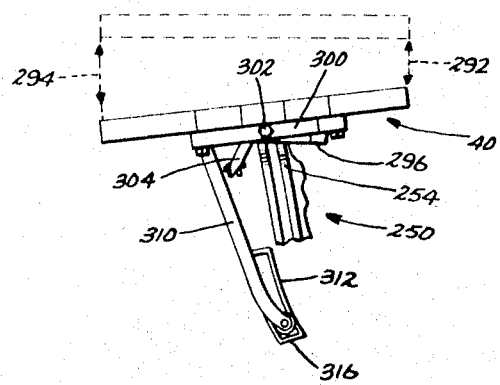
Inventors:
Rollin E. Campbell,
Harry D. Forse,
by Wood, Hurst & Dill
Attorneys.

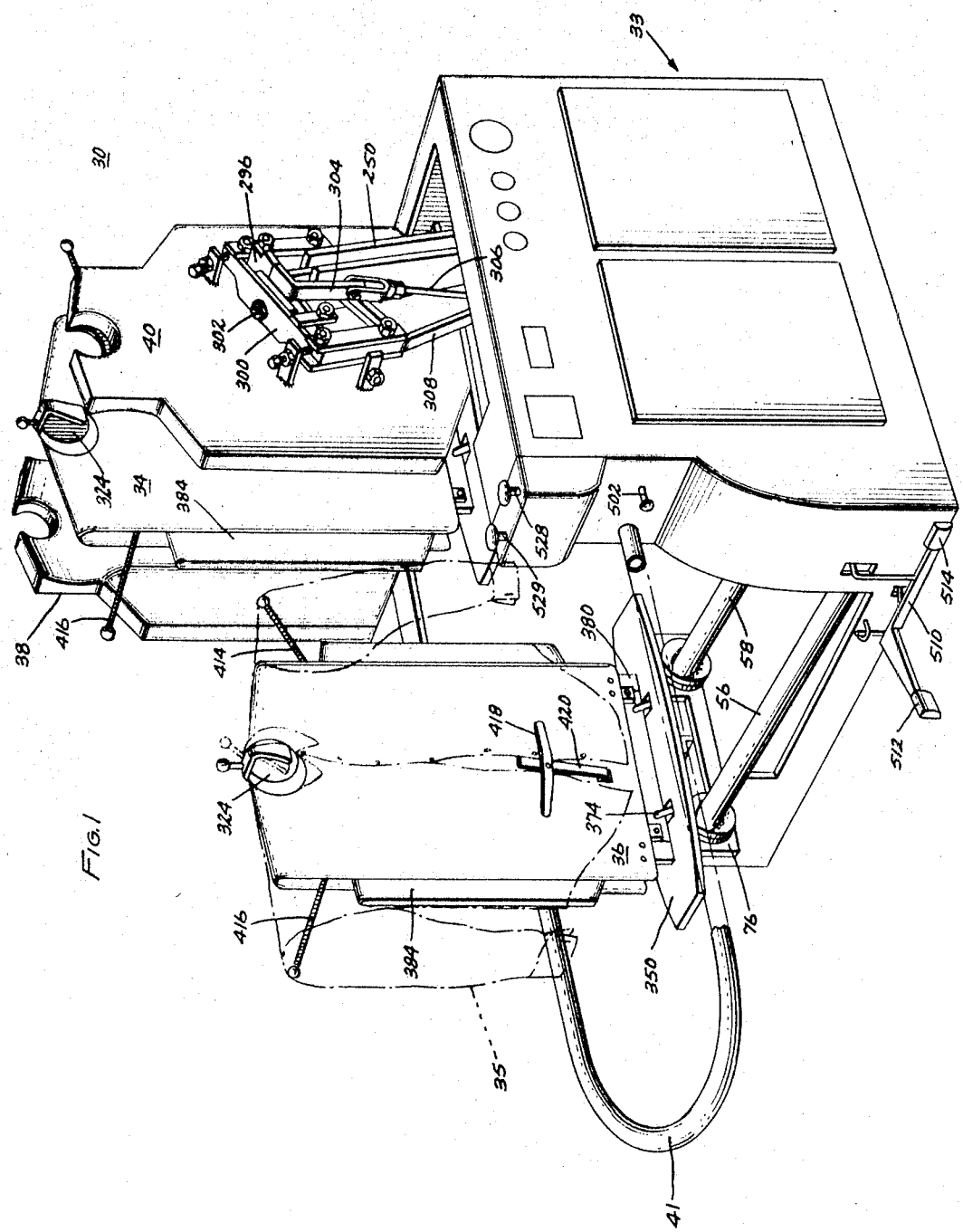

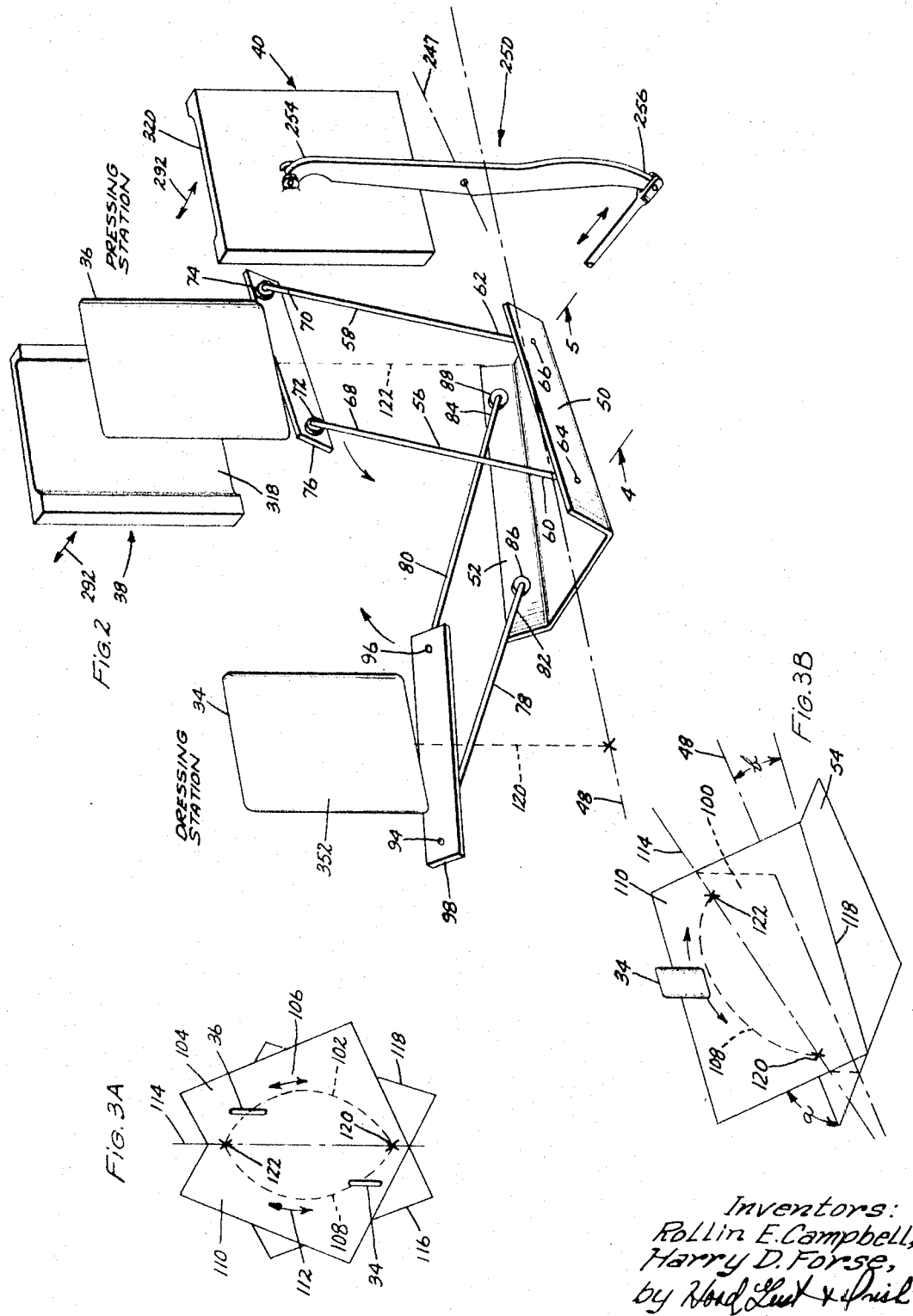

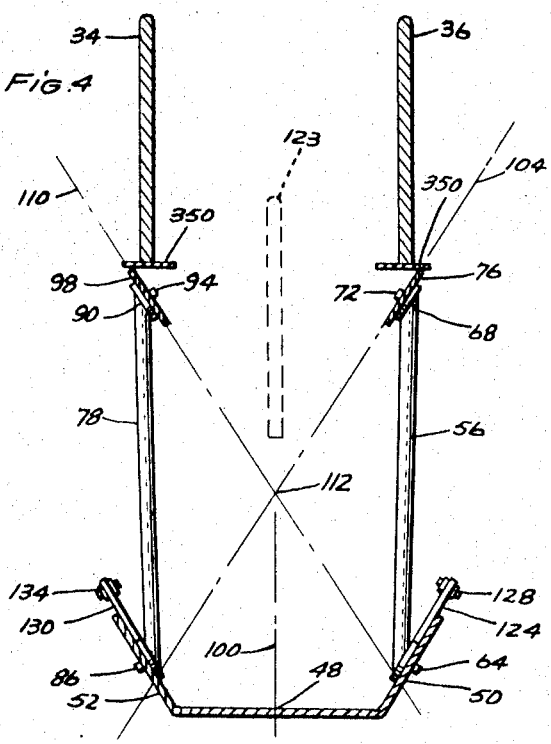
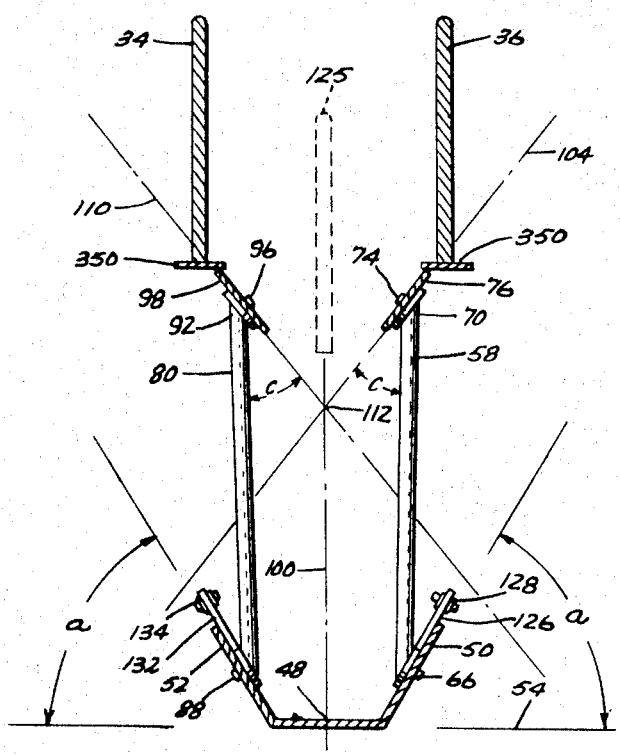

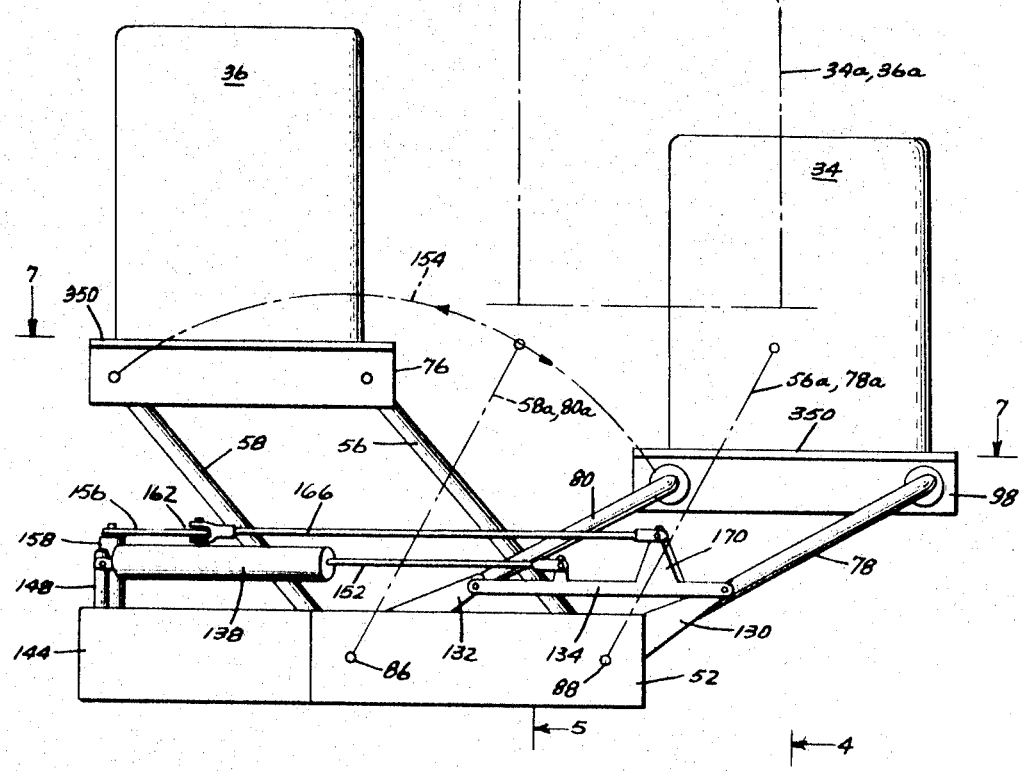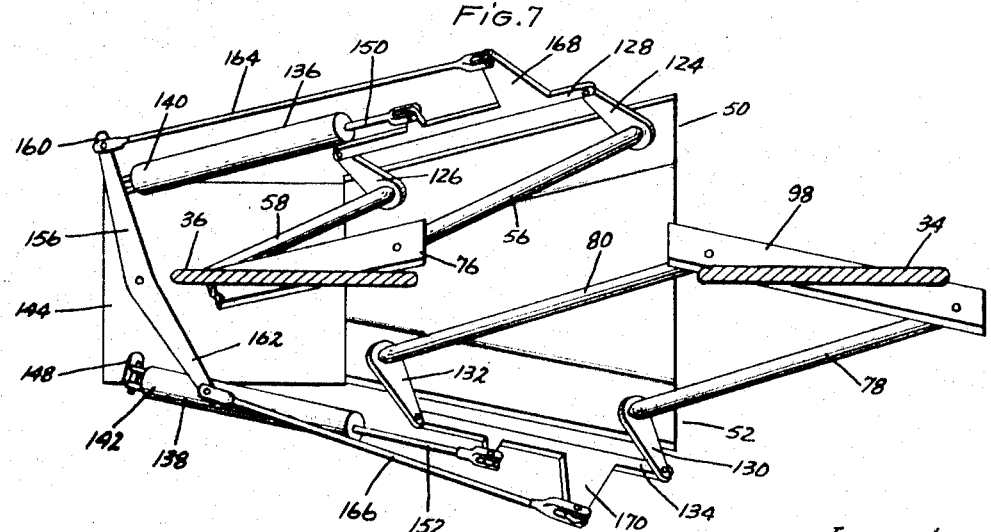

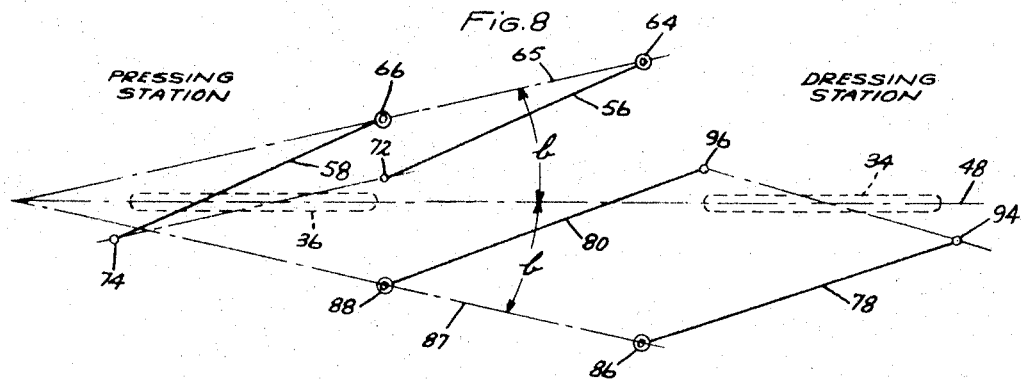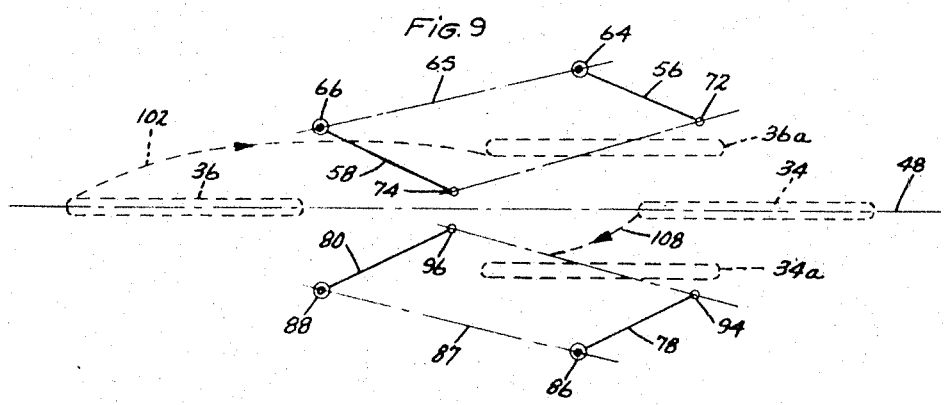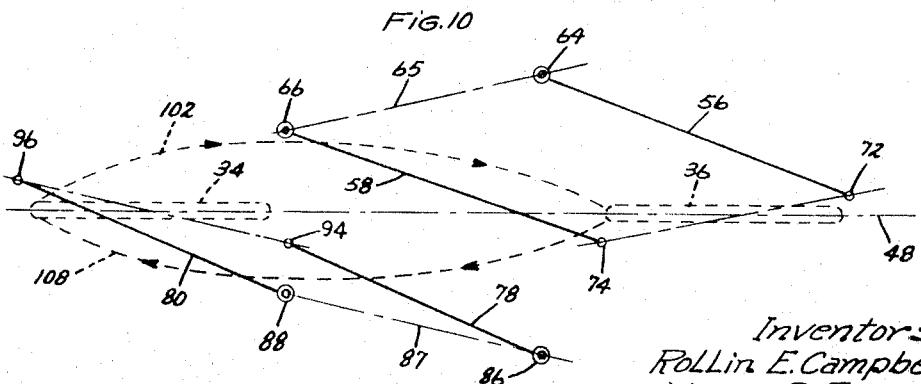

Aug. 26, 1969     R. E. CAMPBELL ET AL     3,463,367
PRESSING MACHINE
Filed Jan. 23, 1967                15 Sheets-Sheet 8
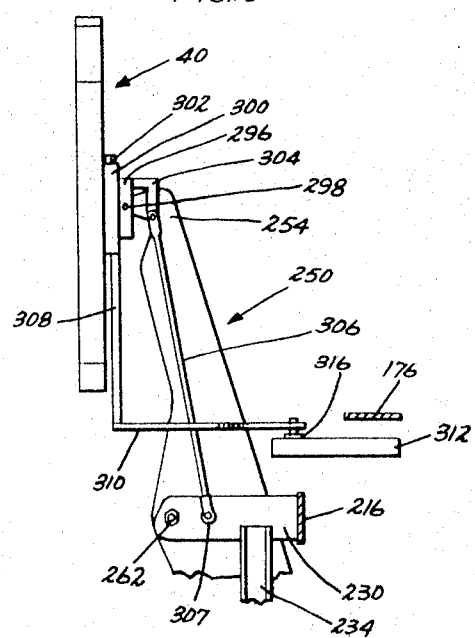
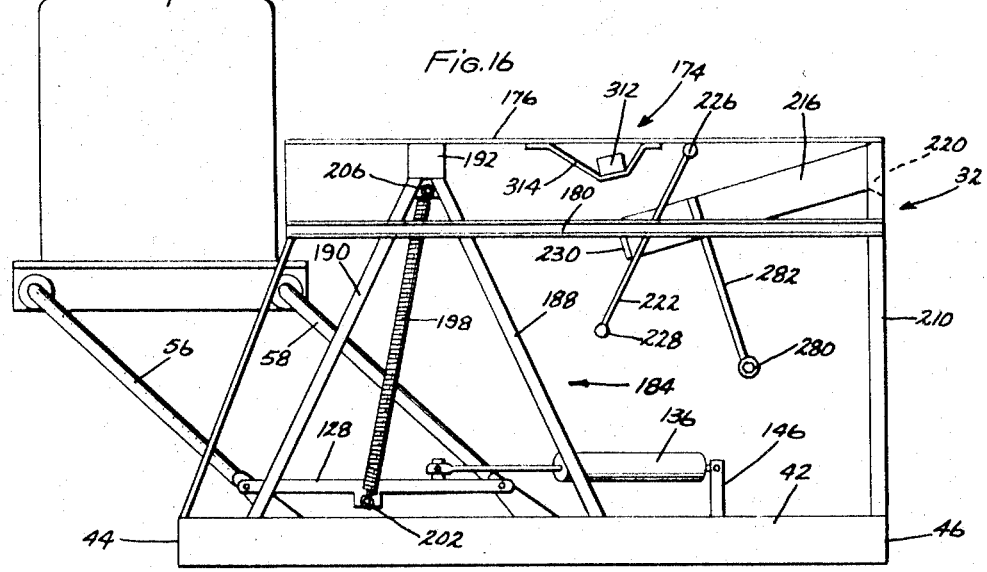
Inventors:
Rollin E. Campbell,
Harry D. Forse,
by Hood, Gust & Dish
Attorneys

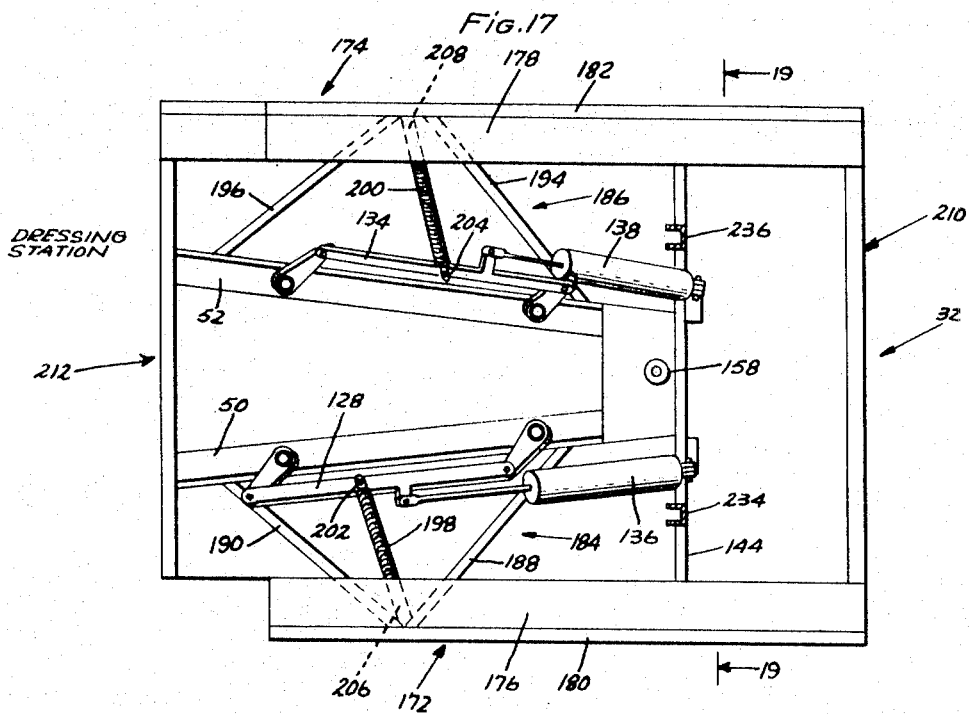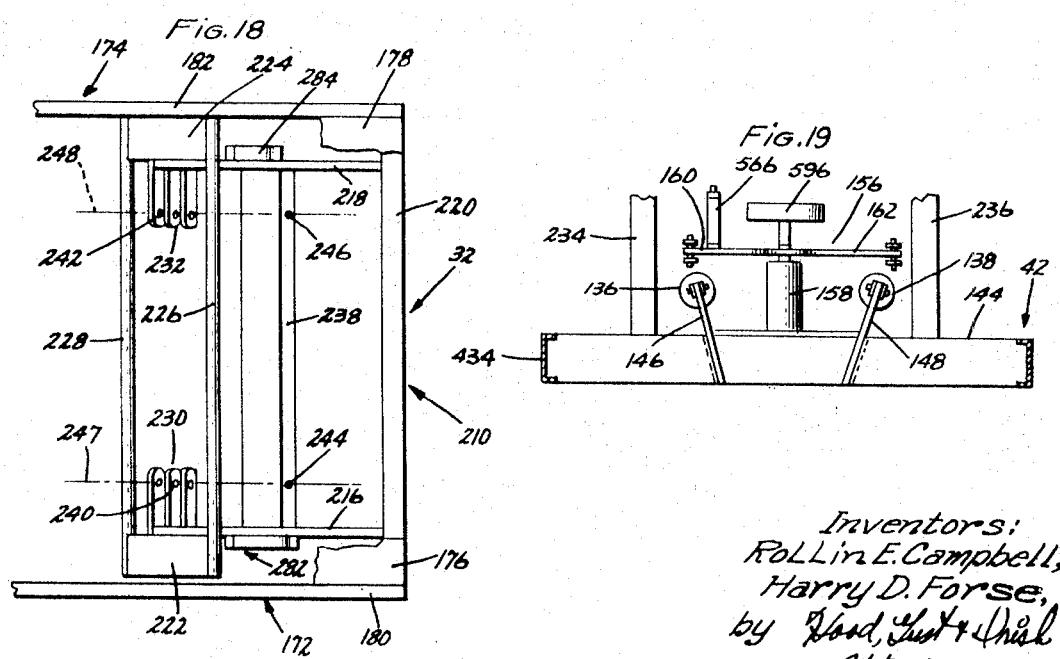

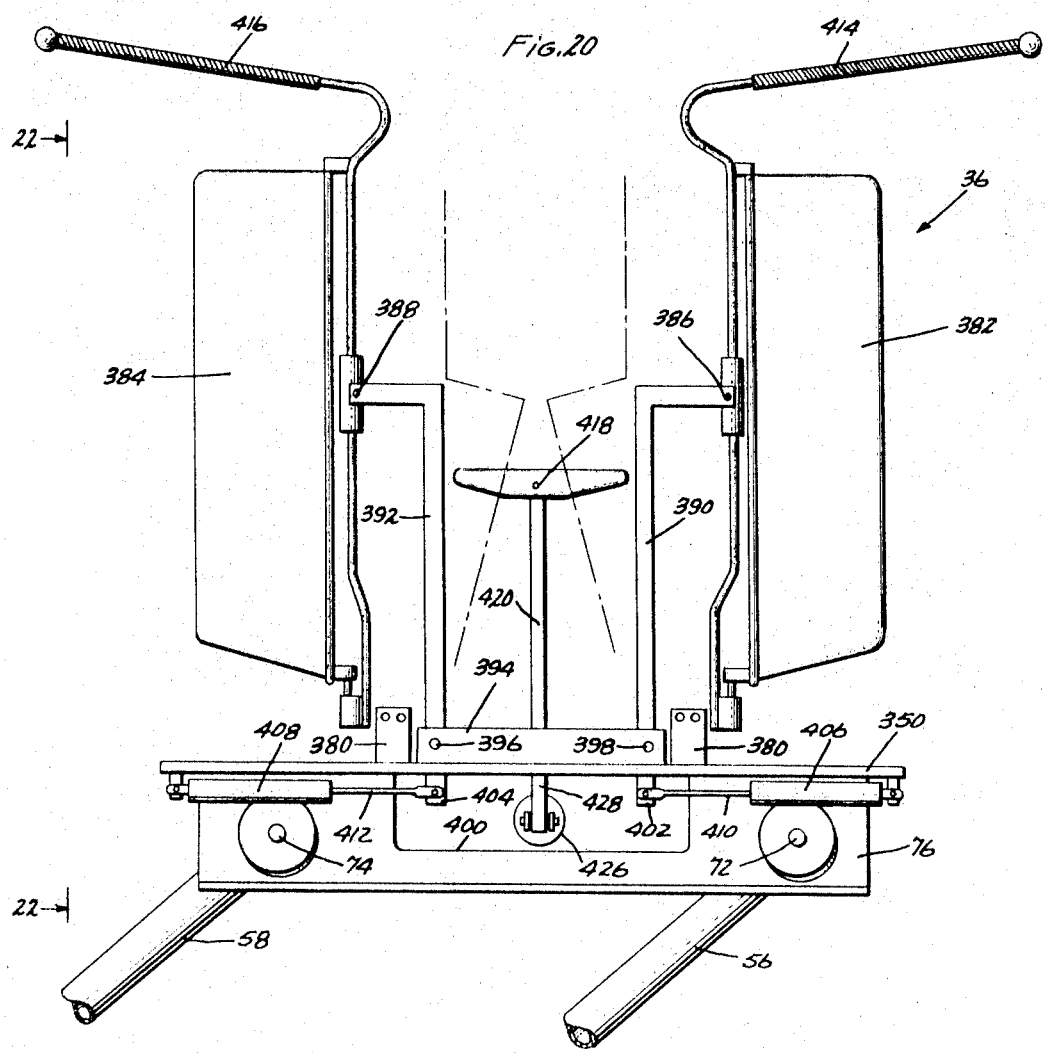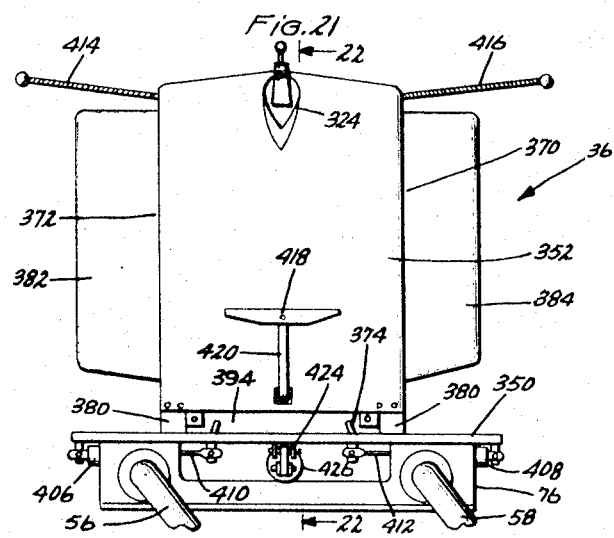

Inventors:
Rollin E. Campbell,
Harry D. Forse,
by Hood, Just & Irish
Attorneys.

Aug. 26, 1969  R. E. CAMPBELL ET AL  3,463,367
PRESSING MACHINE

Filed Jan. 23, 1967  15 Sheets-Sheet 14

Inventors:
Rollin E. Campbell,
Harry D. Forse,
by Hood, Gust & Diehl
Attorneys.

United States Patent Office 3,463,367
Patented Aug. 26, 1969

3,463,367
PRESSING MACHINE
Rollin E. Campbell, Anderson, Ind., and Harry D. Forse, 220 Woods Road, Edgewood Addition, Anderson, Ind. 46011; said Campbell assignor to said Forse
Filed Jan. 23, 1967, Ser. No. 611,106
Int. Cl. D06c 15/02
U.S. Cl. 223—57                                                40 Claims

ABSTRACT OF THE DISCLOSURE

A pressing machine having a horizontal base frame and a pair of upright pressing bucks each movably supported above the base frame by a pair of elongated parallel arms having their lower ends pivotally connected to the base frame and their upper ends pivotally connected to the buck, each buck thus being pivotally movable in an arcuate path between a dressing station and a pressing station. The two paths of arcuate movement of the bucks coincide at the dressing and pressing stations, but are transversely spaced apart therebetween, thus permitting the two bucks to pass each other during simultaneous reversing movement, i.e., movement of one buck from the dressing to the pressing station and of the other buck from the pressing to the dressing station. Pneumatic cylinders are provided for simultaneously moving the bucks in opposite directions, and a pair of heated pressing heads is provided at the pressing station.

BACKGROUND OF THE INVENTION

Field of the invention

This invention relates generally to machines for pressing garments, and more particularly to a pressing machine for finishing the body portions of garments, such as shirts.

DESCRIPTION OF THE PRIOR ART

Shirt pressing machines conventionally comprise a form over which the shirt is draped or dressed, referred to as a buck, which is moved to a position between a pair of complementary heated pressing heads, which in turn are moved into pressing engagement with the buck. Various mechanisms, such as those shown in Patent Nos. 2,280,288 to H. D. Forse and 2,757,833 to J. R. Petre have been proposed utilizing two bucks which are alternately moved from a dressing position to a pressing position. Thus, one buck is in the pressing position with the shirt thereon being pressed by the pressing heads while the other buck is in the dressing position for removal of a previously pressed shirt and dressing of a shirt to be pressed thereon. When the pressing operation is completed, the positions of the two bucks are simultaneously reversed, i.e., the first buck is moved from the pressing position to the dressing position while the second buck is simultaneously moved from the dressing position to the pressing position. Such a mechanism permits one shirt to be pressed while the already pressed shirt is being removed and a shirt to be pressed dressed on a buck, however, such prior machines have utilized mechanical movements which have precluded rapid reversal of the bucks in order to provide optimum operating speed.

SUMMARY OF THE INVENTION

In accordance with the broader aspects of the invention, a pressing machine is provided having a pair of upright pressing bucks. First means is provided for moving one of the bucks in a first arcuate path between first and second longitudinally spaced positions, and second means is provided for moving the other of the bucks in a second arcuate path between third and fourth longitudinally spaced positions, the first and second arcuate paths substantially coincident at their extremities and transversely spaced apart therebetween, thereby permitting the two bucks to pass each other during their respective movements between their two positions.

It is accordingly an object of the present invention to provide an improved pressing machine of the type incorporating two bucks which are alternately movable from a pressing position to a dressing position.

Another object of the invention is to provide an improved pressing machine of a type having a dressing station and a pressing station with two bucks simultaneously moved between the stations wherein such movement is accomplished more rapidly than in prior machines.

The above mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a view in perspective of the improved pressing machine of the invention;

FIG. 2 is a schematic view in perspective illustrating the buck transferring mechanism of the invention;

FIGS. 3A and 3B are schematic views in perspective further illustrating the paths of movement of the two bucks during reversal of their positions;

FIG. 4 is a schematic, cross-sectional view taken generally along the line 4—4 of FIG. 2, but illustrating the bucks in their passing position;

FIG. 5 is a schematic, cross-sectional view similar to FIG. 4, but taken generally along the line 5—5 of FIG. 2;

FIG. 6 is a schematic, side view showing the buck transferring mechanism of the invention;

FIG. 7 is a schematic, top view taken generally along the line 7—7 of FIG. 6;

FIGS. 8 through 10 are diagrammatic views further illustrating the motions of the two bucks during reversal;

FIG. 13 is a rear view, partly in cross-section, taken generally along the line 13—13 of FIG. 12 and further illustrating the mounting and actuating mechanism for the pressing heads;

FIG. 14 is a fragmentary, top view of one of the pressing heads, taken generally along the line 14–14 of FIG. 12;

FIG. 15 is a fragmentary, front view, partly in cross-section, taken generally along the line 15–15 of FIG. 12 and further showing the mounting mechanism for the pressing heads;

FIG. 16 is a fragmentary, side view, with certain parts removed, further illustrating the machine of the invention;

FIG. 17 is a fragmentary, top view, with certain other parts removed, further illustrating the invention;

FIG. 18 is a fragmentary, top view, with certain parts removed, further illustrating the invention;

FIG. 19 is a fragmentary, cross-sectional view taken generally along the line 19–19 of FIG. 17;

FIG. 20 is a fragmentary, side view, with certain parts removed, illustrating the construction of the bucks employed with the machine of the invention;

FIG. 21 is a fragmentary, side view showing one of the bucks with the wings extended;

FIGS. 24, 24A and 24B are fragmentary views, partly in cross-section and partly broken away, illustrating another part of the control mechanism for the machine of the invention;

DESCRIPTION OF THE PREFERRED EMBODIMENT

Figure 11:
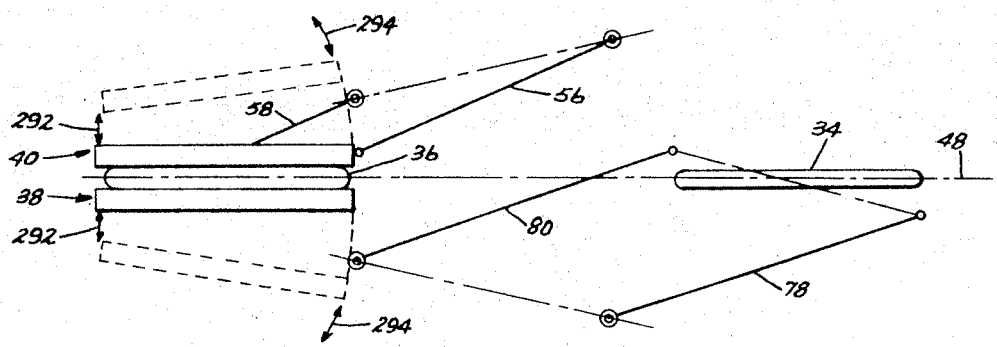
FIG. 11 is a diagrammatic view illustrating the motions of the pressing heads.

Referring now to FIGS. 1 through 19 of the drawings, the improved pressing machine of the invention, generally indicated at 30, comprises a supporting frame 32 enclosed in a cabinet 33, a pair of pressing bucks 34, 36 to be hereinafter more fully described, for receiving a shirt 35 to be pressed, and a pair of heated pressing heads, 38, 40, likewise to be more fully described. The two bucks 34, 36 are pivotally mounted on the base portion 42 of frame 32 for pivotal movement in two arcuate paths between a forward dressing station, and a pressing station between the pressing heads 38, 40, the arcuate paths of movement of the two bucks 34, 36 coinciding at their extremities and being transversely spaced apart at intermediate points so as to permit the two bucks to pass each other during reversal of their respective positions, as will be hereinafter more fully described. A guard rail 41 is provided at the pressing station for protection of the operator.

Referring now particularly to FIGS. 2 through 10 of the drawings, frame 32 has a forward or dressing end 44, a rear end 46 and a longitudinal axis 48. Base portion 42 of the frame 32 includes two bearing plate members 50, 52 respectively extending longitudinally on opposite sides of axis 48 and respectively diverging outwardly and forwardly toward end 44 defining equal angles $b$ with the axis 48; in a specific embodiment of the invention, the angle $b$ is 8°. The bearing plate members 52, 50 are also inclined divergently upwardly and outwardly in a direction transverse to the axis 48 so as to define equal angles $a$ with the horizontal plane 54 of the surface upon which the base portion 42 of frame 32 rests; in the specific embodiment of the invention, the angles $a$ are respectively 60°.

A first pair of elongated arms 56, 58 are provided having inner ends 60, 62 respectively pivotally connected to the bearing plate 50 at longitudinally spaced apart points 64, 66. Arms 56, 58 have upper ends 68, 70 which are respectively pivotally connected at points 72, 74 to supporting plate 76, points 72, 74 being longitudinally spaced apart by the same distance as points 64, 66. Arms 56, 58 are equal in length and it will thus be seen that they form a parallelogram with bearing plate 50 and support plate 76 with support plate 76 thus at all times being parallel with bearing plate 50 and the horizontal plane 54. Buck 36 is supported in upright fashion upon the support plate 76, as will be hereinafter more fully described.

Another pair of equal length arms 78, 80 are provided having inner ends 82, 84 respectively pivotally connected to the bearing plate 52 at points 86, 88 which are in transverse alignment with the pivot points 64, 66 of the other pair of arms 56, 58. Arms 78, 80 have outer ends 90, 92 respectively pivotally connected at points 94, 96 to support plate 98, which in turn supports buck 34 in upright fashion. Pivot points 94, 96 are spaced apart by the same distance as points 86, 88 and thus the support plate 98 will at all times be parallel with the bearing plate 52 and the horizontal plane 54 by reason of the parallelogram arrangement of arms 78, 80, bearing plate 52 and support plate 98.

Support plates 76, 98 are in spaced, parallel relationship with the bearing plates 50, 52, i.e., inclined divergently upwardly and outwardly with respect to the horizontal plane 54 and defining equal angles $a$ therewith, and diverging forwardly toward the dressing end 44 defining equal angles $b$ on opposite sides of the vertical plane 100 which includes the longitudinal axis 48. Referring particularly to FIGS. 4 and 5, the pairs of pivot arms 56, 58 and 78, 80 respectively define angles $c$ with the bearing plates 50, 52 and the support plates 76, 98, angles $c$ being approximately 29° in the preferred embodiment so that the arms 56, 58 and 78, 80 extend upright in slightly toed-out or diverging relationship when the bucks 34, 36 are in transverse alignment, i.e., passing each other during their reversing movement in the position shown in dashed lines 34a and 36a, 56a and 78a, and 58a and 80a in FIGS. 6 and 9.

It will now be seen that the upper ends 68, 70 of the arms 56, 58 and the support plate 76 will travel in an arcuate path 102 in a plane 104 in response to pivotal movement of the arms 56, 58 as shown by the arrows 106. It will further be seen that the plane 104 is in spaced, parallel relationship with the bearing plate member 50, i.e., inclined upwardly and outwardly with respect to the horizontal plane 54 by the angle $a$ and diverging forwardly from the vertical plane 100 by the angle $b$. It will further be seen that the upper ends 90, 92 of the arms 78, 80 and the support plate 98 will move in another arcuate path 108 lying in plane 110 in response to pivotal movement of the arms 78, 80 as shown by the arrows 112. It will be seen that the plane 110 is likewise in spaced, parallel relationship with the bearing plate 52, i.e., being inclined upwardly and outwardly with respect to the horizontal plane 54 by angle $a$ and diverging forwardly toward the dressing end 44 of base frame portion 42 with respect to the vertical plane 100 by angle $b$.

The length of the arms 56, 58 and 78, 80 are chosen so that the inclined planes 104, 110 intersect along line 114 lying in the vertical plane 100 which also includes the longitudinal axis 48. It will now be seen that the two inclined planes 104, 110 respectively intersect the horizontal base plane 54 along lines 116, 118 which likewise respectively define angles $b$ in the horizontal plane 54 on opposite sides of the longitudinal axis 48, and thus that the line 114 defined by the intersection of the inclined planes 104, 110 will be inclined upwardly toward the rear end 46 of frame 32 with respect to the horizontal plane 54. It will further be seen that the two arcuate paths of movement 102, 108 of the support plates 76, 98 and thus of the bucks 36, 34 coincide at longitudinally spaced apart points 120, 122 on the line 114, points 120 and 122 respectively being in vertical alignment with the longitudinal center line 48 and forming the dressing and pressing stations, respectively, the arcuate paths 102, 108 being transversely spaced apart between the points 120, 122 thus permitting the bucks 36, 34 to pass each other during movement between the dressing and pressing stations.

It will now be seen that the bucks 34, 36 occupy the same position when at the dressing station, as shown by the dashed lines 123 in FIG. 4, and that they likewise occupy the same position when at the pressing station, as shown by the dashed lines 125 in FIG. 5, the two bucks however being transversely spaced apart when in their passing positions by reason of the respective arcuate paths of movement 102, 108 as above-mentioned.

It will be observed that the two bucks 34, 36 in their respective pressing stations are spaced vertically above the horizontal plane 54 by a greater distance than when in their dressing positions, this elevation of the pressing position with respect to the dressing position being desirable in the specific embodiment illustrated for convenience of the worker who manually dresses a garment on the buck in the dressing position, i.e., a higher elevation is desired for the pressing station in order to accommodate apparatus thereunder, thus reducing floor space, but such a higher elevation for the dressing station would require an elevated platform for the worker. However, it will be readily understood that if this difference in the elevations of the dressing and pressing positions is not necessary, the bearing plates 50, 52 may be disposed in parallel relationship (thus eliminating the angle $b$) so that the line 114 along which the planes 104, 110 intersect is in spaced parallel relationship with the longitudinal axis 48.

It will be observed further that by reason of the inclination of bearing plates 50, 52 the two bucks 34, 36 will pass each other, i.e., be in transverse alignment, at a point forwardly of the midpoint between the pressing and dressing stations, as shown in dashed lines 34a and 36a, 56a and 78a, and 58a and 80a in FIGS. 6 and 9. While in the illustrated embodiment, the bearing plates 50, 52 and thus the axes 65, 87 of the pivot points 64, 66 and 86, 88 respectively diverge from axis 48 by angles $b$, the same result may be obtained by the employment of a separate bearing plate for each pivot point, the individual bearing plates each defining angle $a$ with the horizontal and angle $b$ with the axis 48, but with the axes 65, 87 of the pivot points being parallel with the axis 48.

It will also be readily understood that a single pivot arm may be employed to support and pivotally move each buck 34, 36 the requisite parallel relationship of supporting plate members 350 with the horizontal in the dressing and pressing positions being maintained by other conventional leveling means, such as chains or cables.

Referring now particularly to FIGS. 6 and 7, the two pairs of pivot arms 56, 58 and 78, 80 and their respective bucks 36, 34 are simultaneously moved between the dressing station and the pressing station, in opposite directions, by the arrangement now to be described. A pair of lever members 124, 126 are respectively rigidly connected to the pivot arms 56, 58 and are interconnected by link 128. Similarly, another pair of levers 130, 132 are rigidly connected to the pivot arms 78, 80 and are interconnected by a link 134. A pair of fluid-actuated cylinders 136, 138 are provided respectively having their rear ends 140, 142 pivotally connected to frame element 144 of base portion 42 by inclined members 146, 148 as best seen in FIG. 19. Fluid-actuated cylinders 136, 138 respectively have their piston rods 150, 152 operatively connected to the links 128, 134. It will thus be seen that piston rod 152 of cylinder 138 in its protracted position will pivot arms 78, 80 and buck 34 to the dressing position, whereas piston rod 150 of cylinder 136 in its retracted position will pivot arms 56, 58 and buck 36 to its pressing position. It will further be seen that retraction of piston rod 152 of cylinder 138 and simultaneous extension of piston rod 150 of cylinder 156 will simultaneously pivot arms 78, 80 and buck 34 from the dressing position to the pressing position, and arms 56, 58 and buck 36 from the pressing position to the dressing position, as shown by the arrows 154 in FIG. 6.

In order to insure simultaneous movement of the bucks 34, 36 in opposite directions between the dressing and pressing positions, an equalizer bar 156 is provided pivotally mounted on vertical post 158 extending upwardly from base frame element 144. The opposite ends 160, 162 of the equalizer bar 156 are respectively connected by equalizer links 164, 166 to arms 168, 170 extending upwardly from the links 128, 134, respectively.

It will now be seen that with the apparatus above-described the bucks 34, 36 may be simultaneously moved in opposite directions from a position as shown in FIGS. 2, 6, 7 and 8, in which buck 34 is at the dressing station and buck 36 is at the pressing station, through a passing position as shown in FIGS. 4, 5 and 9 in which the bucks 34, 36 are in transverse, spaced-apart alignment, to a position in which the buck 34 is at the pressing position and the buck 36 at the dressing station, as shown in FIG. 10, the bucks 34, 36 moving simultaneously in the two arcuate paths 102, 108 respectively lying in the inclined planes 104, 110.

Referring now to FIGS. 16 and 17, in order to provide a faster simultaneous reversing motion for the bucks 34, 36 the arrangement now to be described is provided. Frame 32 is provided with spaced, parallel, longitudinally and upwardly extending side leg portions 172, 174 respectively having top plate members 176, 178 and side members 180, 182. Two A-frames 184, 186 are respectively provided extending between the bearing plate members 50, 52 and the top plate and side members 176, 178 and 180, 182. A-frame assembly 184 comprises members 188, 190 having lower ends respectively secured to bearing plate 50 in spaced-apart relationship and upper ends joined to member 192 which in turn is secured to the top plate member 176. A-frame assembly 186 similarly comprises members 194, 196 having lower ends respectively secured to the other bearing plate member 52 and upper ends secured to a similar plate member (not shown) which in turn is secured to the top plate member 178. A pair of over-center springs 198, 200 is provided having lower ends 202, 204 respectively secured to the link members 128, 134 and upper ends 206, 208 respectively secured adjacent the junctions of the respective members 188, 190 and 194, 196.

Figure 12:
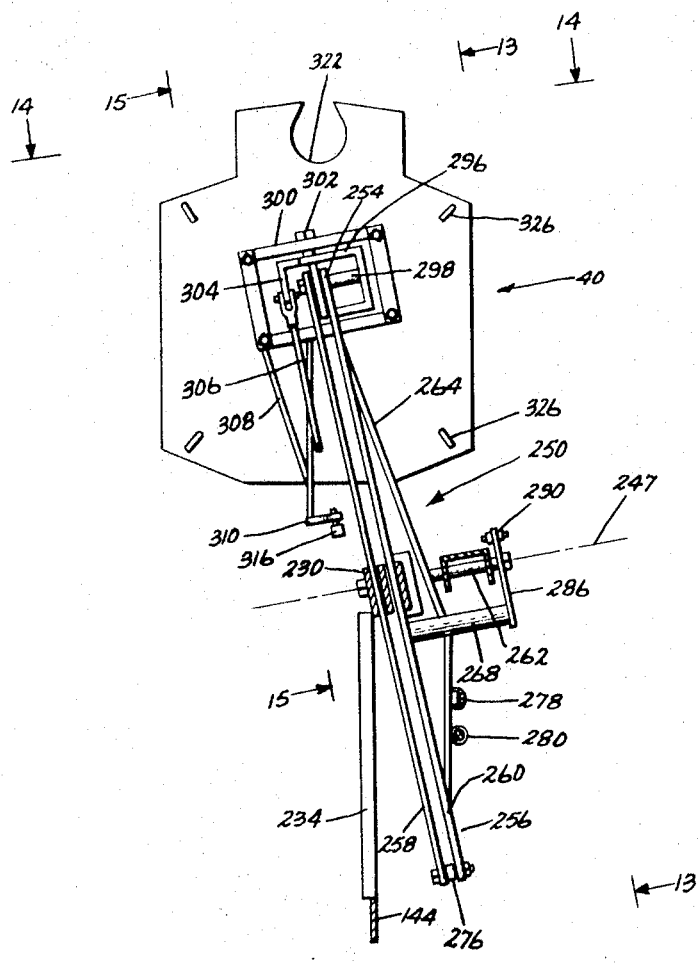
FIG. 12 is a fragmentary, side view, partly in cross-section, illustrating the mounting mechanism for one of the pressing heads.

Referring now to FIGS. 11 through 18, the mounting and actuating mechanism for the heated pressing heads 38, 40 will be described. Frame 32 also has an upstanding rear portion 210, it being observed that the side leg portions 172, 174 and the rear leg portion 210 define a generally U-shaped configuration having an open end 212, the dressing station being forwardly of the open end 212 of the frame and the pivoted arms 56, 58 and 78, 80 with their respective bucks 36, 34 moving between the side leg portions 172, 174 and through the open end 212. A pair of pivot support members 216, 218 are respectively positioned inwardly of the side leg frame portions 172, 174 being inclined upwardly and rearwardly and secured to upper cross member 220 of the rear frame portion 210. Members 216 and 218 are, at their forward ends, spaced from and joined to the side frame members 180, 182 by inclined plate members 222, 224. Transverse tension members 226, 228 are secured to and extend between the upper and lower extremities of the plate members 222, 224. A plurality of longitudinally spaced apart, inwardly extending, inclined pivot bracket members 230, 232 are secured to the forward end of the members 216, 218. Vertical members 234, 236 connect pivot bracket members 232, 230 to the transverse frame element 144 of the base frame portion 42. A transverse frame element 238 extends between the members 216, 218. Pivot bearing openings 240, 242 are formed in the pivot bracket plates 230, 232, respectively in alignment with openings 244, 246 in the transverse member 238. Openings 240, 244 are in alignment on a pivot axis 247 which is parallel with the longitudinal axis 48, but which is inclined upwardly and rearwardly toward the rear end portion 210 of the frame 32, as best seen in FIG. 12. Openings 242, 246 are likewise aligned on pivot axis 248 in spaced parallel relationship with the pivot axis 247.

Pressing heads 40, 38 are moved between their open positions and their closed pressing positions by a pair of lever member assemblies 250, 252. Each of the lever member assemblies 250, 252 has upper and lower ends 254, 256 and comprises a pair of plate members 258, 260. Lever member assemblies 250, 252 are pivotally mounted intermediate their ends to pivot bracket members 230, 232 by a pivot post member 262 extending through the respective openings 240, 244 and 242, 246 on the pivot axes 247, 248, the pivot post 262 being secured to the respective lever member assemblies 250, 252 and rotating therewith in response to pivotal movement. Each of the lever member assemblies 250, 252 further has a rearwardly extending element 264, 266 having a post member 268, 270 connected thereto and extending rearwardly therefrom parallel but eccentric with respect to the pivot axes 247, 248.

The pressing heads 38, 40 are respectively pivotally connected to the upper ends 254 of the lever member assemblies 252, 250 by an arrangement hereinafter to be described. The pressing heads 38, 40 and the lever member assemblies 250, 252 are actuated between their closed or pressing positions, as shown in solid lines in FIG. 13, and their open positions, as shown in dashed lines, by a floating fluid-actuated cylinder 272 having one end 274 connected to and supported by the lower end lever member assembly 252 and having its piston rod 276 connected to and supported by the lower end 256 of the lever member assembly 250. Lever member assemblies 250, 252 are normally urged to their open positions by a pair of springs 278, 280. Spring 280 has one end connected to the member 266 of lever member assembly 252 and its other end connected to a bracket member 282 secured to and extending downwardly from member 216. The other spring 278 has one end connected to member 264 of lever member assembly 250 and its other end connected to bracket member 284 connected to and extending downwardly from member 218.

The in and out pivotal movement of the lever member assemblies 250, 252 is equalized by a pair of lever members 286, 288 connected by an equalizer rod 290. Lever member 286 is connected intermediate its ends to the pivot rod 262 of lever member assembly 250 and at one end to the post member 268. The other lever member 288 is connected intermediate its ends to the pivot rod 262 of the lever member assembly 252 and at one end to the post member 270 of the lever member assembly 252.

It will now be seen that with the piston rod 276 of fluid cylinder 272 in its retracted position, lever member assemblies 250, 252 and pressing heads 40, 38 will be in their open positions, as shown in dashed lines in FIG. 13, and that actuation of the fluid cylinder 272 to extend its piston rod 276 will cause the lever member assemblies 250, 252 to pivot inwardly in a plane normal to the pivot axes 247, 248 thereby to move the pressing heads, 40, 38 to their closed positions in pressing engagement with one or the other of the bucks 34, 36. Release of fluid cylinder 272 will then cause the lever member assemblies 250, 252 and the pressing heads 40, 38 to return to their open positions under the influence of the springs 278, 280.

Referring again briefly to FIGS. 8 through 11, it will be again observed that the bucks 34, 36 move into and away from the pressing position in arcuate paths 108, 102, movement of the bucks being accomplished when the pressing heads 38, 40 are in their open positions. In order to accommodate this arcuate movement of the bucks 34, 36 into and away from the pressing position, the pressing heads 38, 40 are not only moved transversely away from the pressing position, as shown by the arrows 292, but are also pivoted outwardly and rearwardly during movement to their open positions, as shown by the arrows 294 in FIG. 11. Referring back to FIGS. 12, 13, and 14, in order to provide this pivotal movement, the upper ends 254 of the lever member assemblies 250, 252 are pivotally connected to a frame 296 by a pivot pin 298 disposed on an axis parallel with the pivot axes 247, 248. Frame 296 is in turn pivotally connected to another frame 300 by pivot pin 302 for pivotal movement about an axis normal to the axis of the pivot pins 298, frame 300 being secured to the pressing heads 38, 40. It will now be seen that this double pivotal mounting of the pressing heads 38, 40 on the lever member assemblies 252, 250 provides for pivotal movement of the pressing heads in the plane of pivotal movement of the lever member assemblies 250, 252 and also normal thereto in the direction shown by the arrows 294, the pivotal movement in the plane of movement of the lever member assemblies 250, 252 being employed to insure that the pressing heads 38, 40 are in parallelism in their pressing position and the pivotal movement normal thereto being provided to accommodate in the arcuate movement of the bucks 34, 36 into and away from the pressing position, as above-described.

In order to provide these motions, a lever member 304 extends outwardly from each of the frames 296, and is connected by a rod member 306 to the pivot bracket 230 at point 307 outwardly from the pivot rod 262, as best seen in FIG. 15. With the length of the rod 306 suitably chosen it will be seen that by reason of its eccentric connection at point 307, rod 306 and member 304 cooperate to maintain the respective pressing heads 38, 40 in a vertically upright position during outward pivotal movement of the lever member assemblies 250, 252.

In order to provide the outward pivotal motion of the pressing heads 38, 40 during their movement to their open positions, a member 308 is provided extending downwardly from the frame 300 and having another member 310 connected to its lower extremity and extending laterally outwardly. A cam track 312 is provided suspended below each top plate member 176, 178 of the side leg frame portions 172, 174 by suitable brackets 314. A suitable cam follower roller 316 is mounted on the outer end of the member 310 and cooperates with the cam track 312 to provide the pivotal movement 294 of the respective pressing head 38, 40 in response to outward and inward pivotal movement of the lever member assemblies 250, 252.

Figure 22:
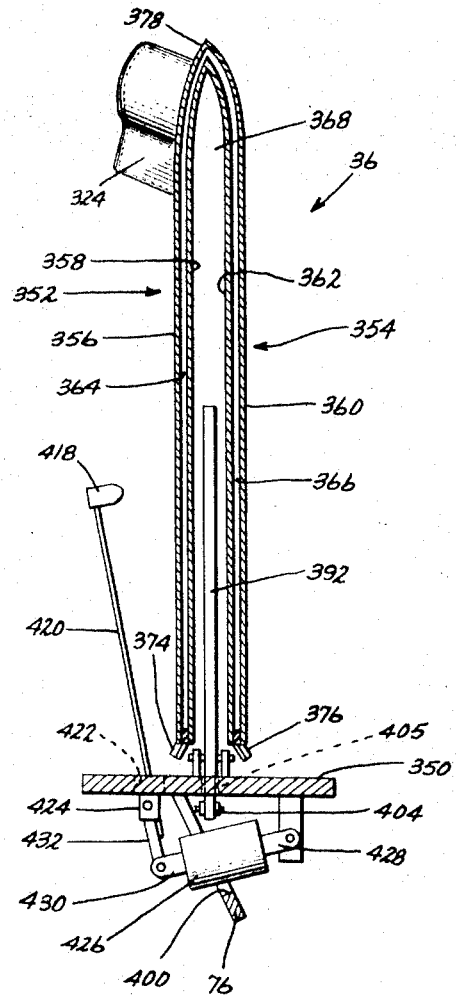
FIG. 22 is a fragmentary, cross-sectional view taken generally along the line 22—22 of FIG. 21.

Pressing heads 38, 40 have their facing surfaces 318, 320 suitably curved to conform to the configuration of the bucks 34, 36. Pressing heads 38, 40 may further have a suitable recess 322 open at the top thereof to accommodate a conventional collar horn 324 secured adjacent the top of the bucks 34, 36, as seen in FIGS. 21 and 22. Pressing heads 38, 40 are suitably heated in conventional fashion, as by steam, and may have fittings 326 for connection of suitable steam lines, (not shown), thereto, as is well known to those skilled in the art.

Figure 25:
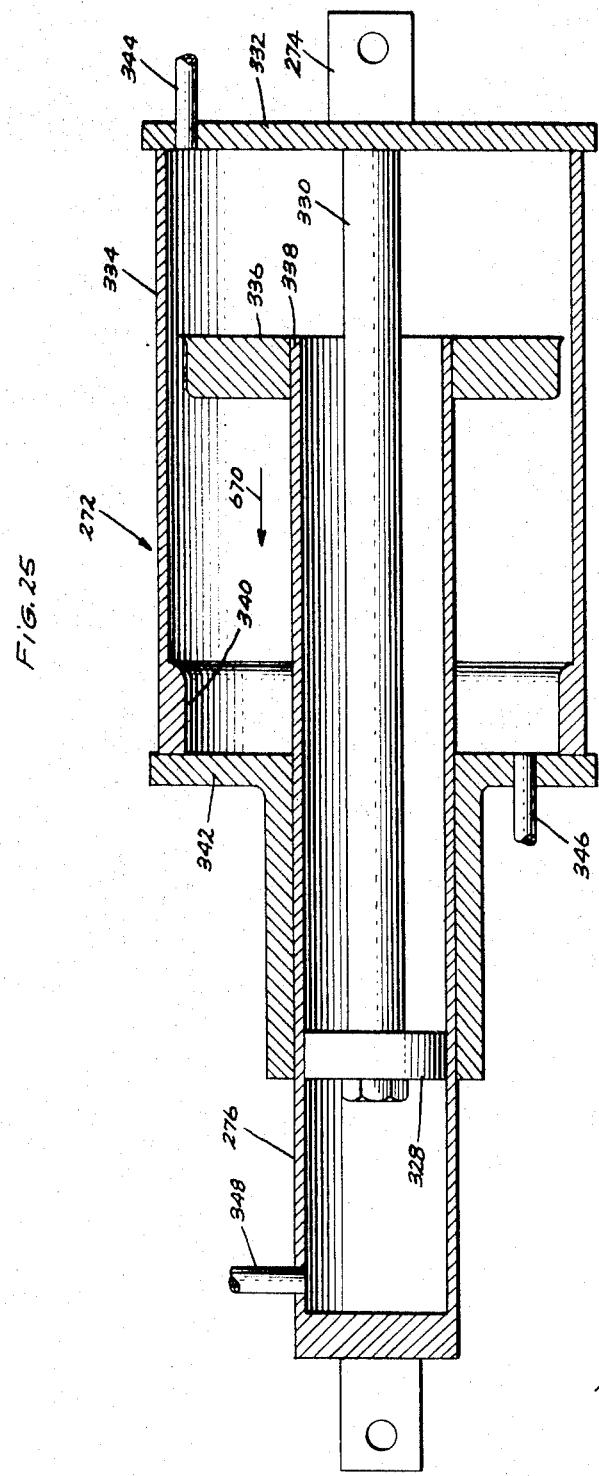
FIG. 25 is a cross-sectional view showing the pressing head actuating cylinder.

Referring now to FIG. 25 in a preferred embodiment of the invention, fluid-actuated cylinder 272 is pneumatically actuated and is of the double piston type, similar to that described and illustrated in Patent No. 2,458,976. Here, piston rod 276 is hollow, forming a cylinder having a piston 328 moving therein mounted on a piston rod 330 which is secured to the rear end wall 332 of the large cylinder 334. Another piston 336 is secured to the inner end 338 of the hollow piston rod 276. The larger piston 336 normally has a clearance with the inner wall of the larger cylinder 334, but forms a sealing relationship with a reduced wall portion 340 at the forward end wall 342 for a purpose to be hereinafter more fully described. An inlet conduit 344 communicates with the larger diameter section of the large cylinder 334 and another conduit 346 communicates with the smaller diameter section defined by the wall portion 340, for a purpose to be hereinafter more fully described. Another air inlet conduit 348 communicates with the interior of the hollow piston rod 276.

Referring now to FIGS. 20, 21 and 22, the construction of the buck 36 will be described, it being understood that the two bucks 34, 36 are identical. A horizontal plate member 350 is mounted on the support plate 76, plate member 350 having its longitudinal axis parallel with the longitudinal axis of the plate member 76. Buck 36 is in turn mounted on the plate member 350 parallel with the longitudinal axis 48 so that the buck is in vertical alignment with axis 48 in its dressing and pressing positions, 120, 122. Buck 36 has forward and rear sides 352, 354, the forward side being defined as the side which is faced by the operator at the dressing station. Sides 352, 354 are formed by spaced-apart metal sheets 356, 358 and 360, 362 which respectively define closed chambers 364, 366 therebetween and a central cavity 368 which is open at opposite ends 370, 372 of the buck. A heating medium, such as steam, may be introduced to the chambers 364 and 366 through suitable fittings 374, 376 by suitable flexible connections (not shown). Conventional collar horn 324 for receiving and forming a collar of the shirt 35 is attached to the front side 352 adjacent its upper end 378. The front and rear sides 352, 354 are secured to the base plate member 350 by means of suitable members 380 which project upwardly from the base plate 350. It will be readily understood that the front and back sides 352, 354 may be covered with a suitable padding (not shown).

A pair of retractable wings 382, 384 are provided for extending the shirt 35 during the pressing operation, wings 382, 384 being retractable into the cavity 368 between the sides 352, 354, and extensible through the side openings 370, 372 to the position shown in FIG. 21. Wings 382, 384 are pivotally mounted, as at 386, 388 to lever members 390, 392 which are pivotally mounted to bracket member 394 secured to the base plate member 350 and extending upwardly therefrom, as at 396, 398. Support plate member 76 has a cut-out portion 400 formed therein into which the lower ends 402, 404 of lever members 390, 392 extend through suitable openings 405 in the base plate member 350. Suitable fluid-actuated cylinders 406, 408 are provided having their outer ends connected to the base plate member 350 and having their piston rods 410, 412 operatively connected to the lower ends 402, 404 of the lever members 390, 392.

It will now be seen that when the piston rods 410, 412 of the fluid cylinders 406, 408 are retracted, the lever members 390, 392 will be pivotally moved inwardly to the positions shown in dashed lines in FIG. 20 thereby retracting the wings 382, 384 substantially into the cavity 368 between the front and back sides 352, 354 of the buck 36. Similarly, the extension of the piston rods 410, 412 will pivotally move the lever members 390, 392 outwardly to their positions shown in solid lines in FIG. 20 thereby to move the wings 382, 384 to their extended positions as shown in FIG. 21. Conventional flexible members 414, 416 are attached to the wings 382, 384 extending outwardly therefrom for receiving the sleeves of the shirt being pressed.

In order to clamp the tail of the shirt during the pressing operation, a tail clamp 418 is provided secured to the upper end of lever member 420 which extends through opening 422 in the base plate member 350 and is pivotally mounted thereon, as at 424. Another fluid actuated cylinder 426 is provided having its outer end connected to the base plate member 350 by post 428 and its piston rod 430 operatively connected to the lower end 432 of the lever member 420, cylinder 426 extending through the cut-out portion 400 of the support member 76. It will thus be seen that when the piston rod 430 of the fluid cylinder 426 is retracted, tail clamp 418 will be pivotally moved away from the front side 352 of the buck, whereas when the piston rod 430 is extended, the tail clamp will be pivotally moved toward the front side 352 thereby to clamp the tail of the shirt against the buck.

Figure 23:
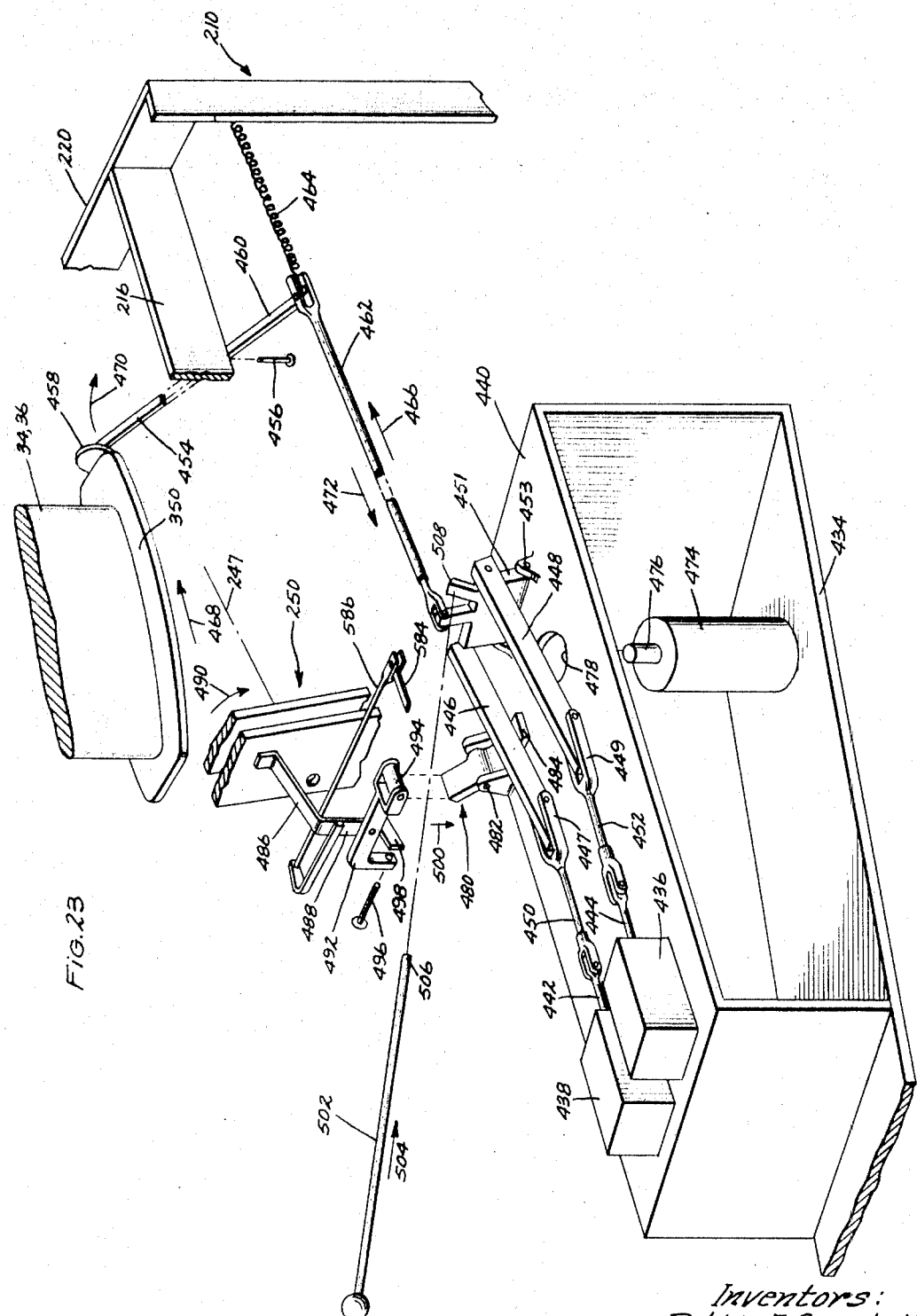
FIG. 23 is a fragmentary view in perspective, partly in cross-section and partly broken away, illustrating a part of the control mechanism for the machine of the invention.
Figure 24:
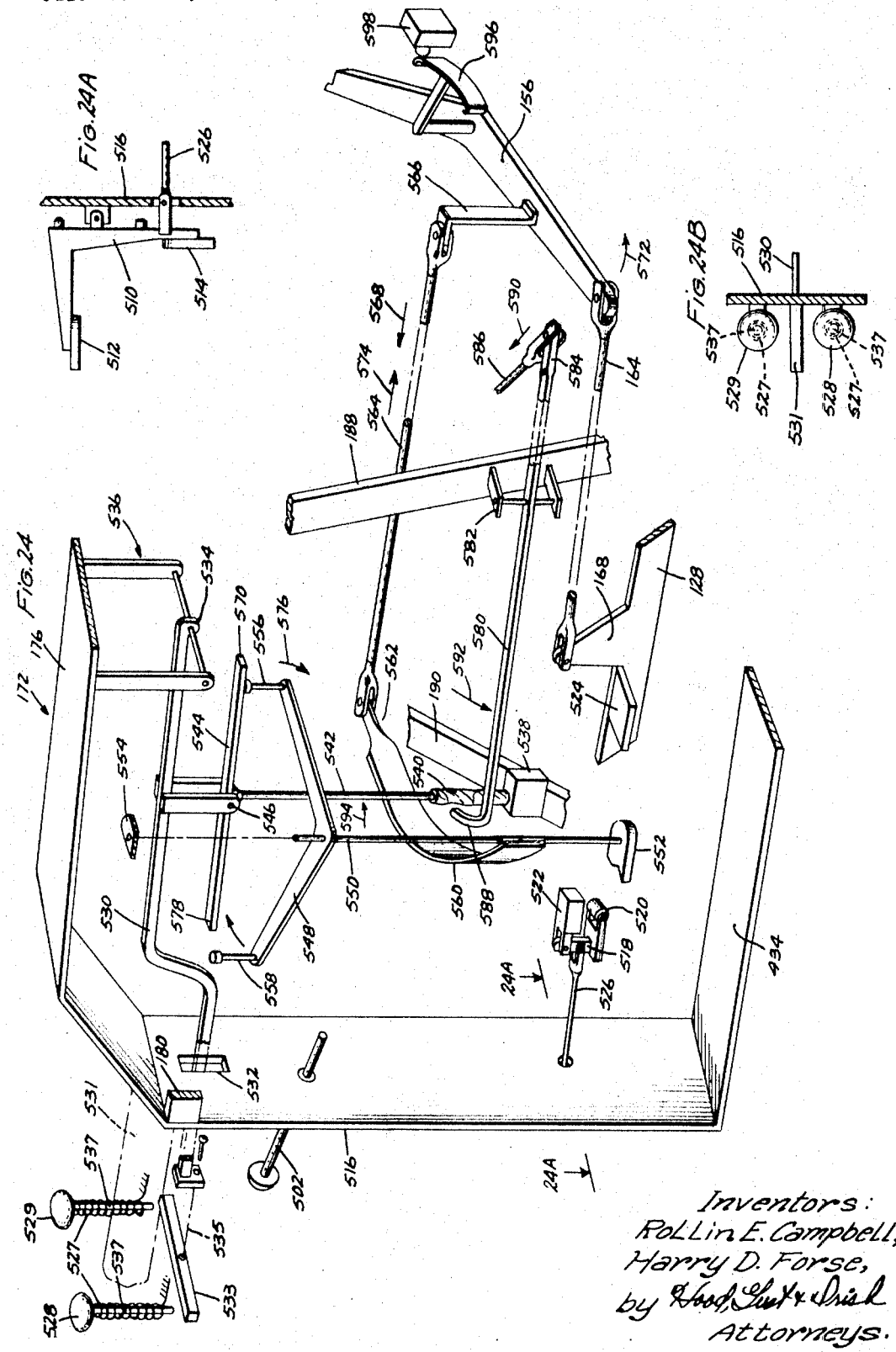
Figure 26:
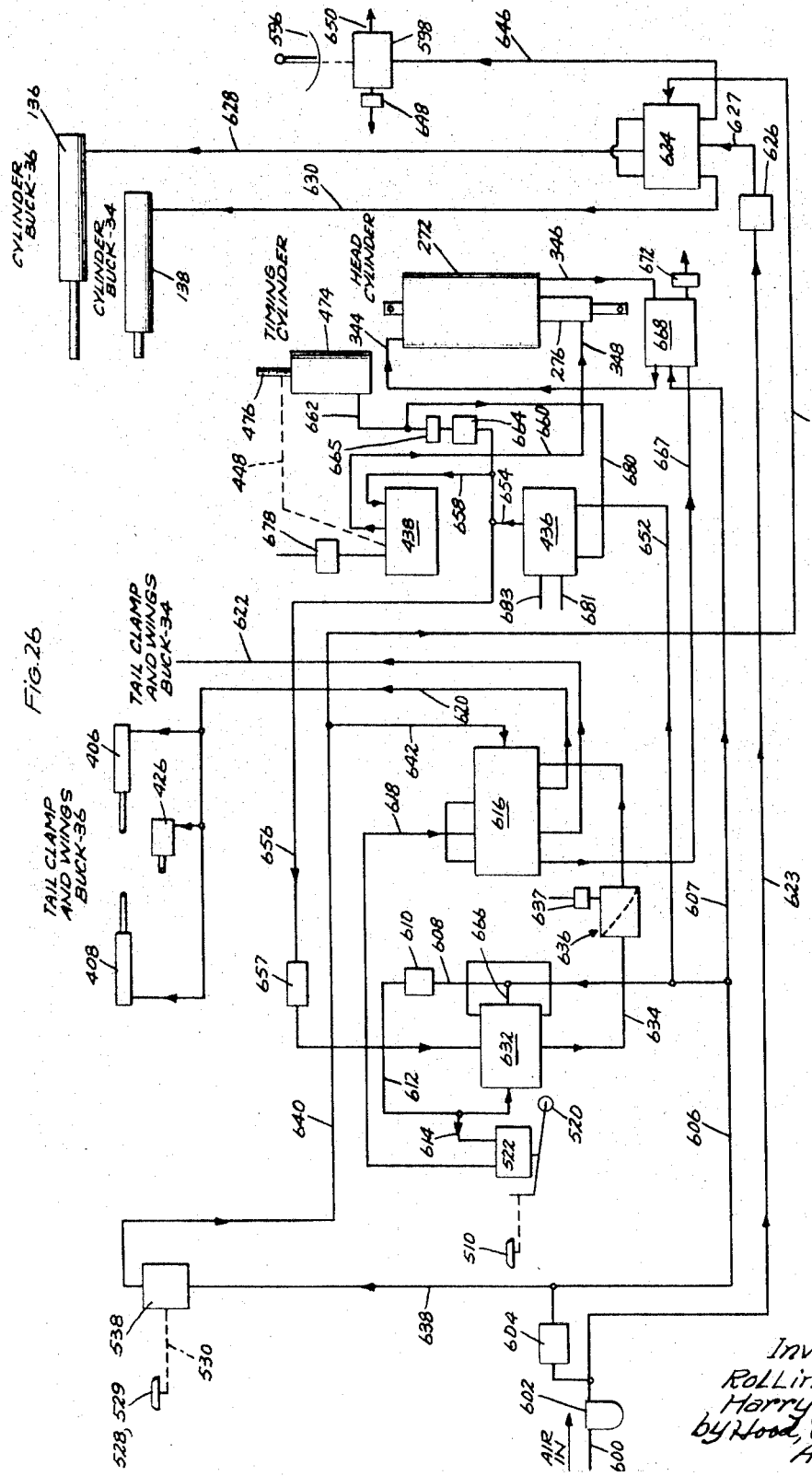
FIG. 26 is a schematic view showing the pneumatic control system for the machine of the invention.

Referring now to FIGS. 23, 24 and 26, in a specific embodiment of the machine of the invention, the several fluid-actuated cylinders above-described are pneumatically actuated and the programming of the operations of the machine is likewise pneumatically actuated, as well now be described. Referring particularly to FIG. 23, a pair of control valves 438, 436 are respectively mounted on a plate member 440 supported on the side rail 434 of the base frame portion 42. Head closing control valve 436 and head opening-snubber control valve 438 are both of the manually piloted, double spring return type. The actuating rods 442, 444 of control valves 438, 436 are respectively connected to knuckle arms 446, 448 by links 450, 452 and knees 447, 449. Knuckle arms 446, 448 are respectively pivotally connected to a member 451 which in turn is pivotally connected to the plate 440, as at 453.

A lever member 454 is provided pivotally connected to the frame member 216, as at 456, and has a pad 458 at its outer end which is engaged by base plate member 350 of a buck 34, 36 when the buck is moved to its extreme rearward pressing position. The other end 460 of the lever member 454 is connected to rod 462 which in turn is connected to member 451. A spring 464 also connects end 460 of lever member 454 to the rear frame 210 and normally retracts rod 462 in the direction shown by the arrow 466 thereby to pivot the member 451 rearwardly so as to extend the actuating rods 442, 444 of the control valves 438, 436 to move their respective spools to their "normal" position. It will be seen, however, that rearward movement of base plate member 350 of the bucks 34, 36 in the direction shown by the arrow 468 to its extreme rearward pressing position would cause base plate member 350 to engage pad 458 on lever member 454 thereby pivotally moving the lever member 454 in the direction shown by the arrow 470 thereby actuating rod 462 forwardly in the direction shown by the arrow 472, in turn pivotally member 451 forwardly and actuating the rods 442, 444 of valves 438, 436 to their forward positions, simultaneously to shift the spools of these two valves. A pneumatic timing cylinder 474 is provided supported in an upright position on the side rail 434 and having a piston rod 476 which in its extended position extends upwardly through opening 478 in the plate member 440 so as to engage knuckle arm 448 and to pivot the same upwardly thereby to break the knee 449 and to retract the actuating rod 444 of control valve 436.

Knuckle arm 446 is independently pivoted upwardly thereby to break knee 447 and to retract actuating rod 442 of control valve 438 by a lever member 480 which is pivotally mounted on plate member 440, as at 482, and which has an end 484 which underlies the knuckle arm 446. A bracket 486 is secured to lever member assembly 250 and has a lower end 488 extending forwardly of the lever member assembly and downwardly and outwardly with respect to the pivotal axis 247 so that end 488 will move downwardly in response to pivotal outward movement of the lever member assembly in the direction shown by the arrow 490. A lever 492 is pivotally mounted on the lower end 488 of the bracket 486 and has a roller 494 mounted on its outer end. Lever member 492 is restrained against upward movement by means of a screw 496 which engages extension 498 of the bracket member 486, however lever member 492 is free to pivot downwardly.

With the above-described arrangement, as the lever member assembly 250 is pivotally moved outwardly in direction 490 thereby to move pressing head 40 to its open position, as above-described, bracket 488, lever member 492 and roller 494 will move downwardly as shown by the arrow 500 so that roller 494 engages the outer end of lever member 480 thereby pivotally moving the same so that end 484 pivots the knuckle arm 446 upwardly, in turn to break knee 447 and to retract actuating rod 442 of control valve 438. It will further be observed that when the lever member assembly 250 pivotally moves inwardly thereby to move the pressing head 40 to its pressing position, member 486 and lever member 492 will move upwardly, however, when the roller 494 engages the underside of lever member 480, the lever member 492 will be pivoted downwardly so that the roller will move upwardly past the lever member 480 without actuating the same.

Manual rearward pivoting of member 451 thereby simultaneously to retract actuating rods 442, 444 of control valves 438, 436 and in turn to cause immediate opening of the pressing heads 38, 40 is accomplished by means of a manually actuated push rod 502 which is moved in the direction shown by the arrow 504 so that its inner end 506 engages projection 508 on the member 451.

As will be hereinafter more fully described, timing of the pressing operation is initiated when a buck 34, 36 is moved to its extreme rearward pressing position thereby actuating lever member 454 and rod 462 to pivot member 454 forwardly, thereby simultaneously moving both of the knuckle arms 446, 448 and the actuating rods 442, 444 of control valves 438, 436 forwardly. As will be hereinafter decribed, this event initiates actuation of the timing cylinder 474 and extension of its piston rod 476 which, after a predetermined time interval, moves upwardly to engage the knuckle arm 448 thereby to break the knuckle and pivot the same upwardly to retract actuating rod 444 of control valve 436. As will be further described hereinafter, this event initiates deactuation of the main cylinder 272 pivotally to move the lever members 250, 252 and the pressing heads 40, 38 away from their pressing positions, which in turn results in pivotal upward movement of knuckle arm 446 which breaks the knuckle and retracts actuating arm 442 of control valves 438.

Referring now particularly to FIGS. 24 and 24A, a foot-actuated pedal lever 510 is provided at the operator's position pivotally mounted intermediate its ends on front frame member 516, and having "kick-on" and "kick-off" pedals 512, 514 mounted on its opposite ends. Valve 522 is provided coupled in the pneumatic system to actuate the buck tail clamps and wings, as will hereinafter be more fully described. Valve 522 is mounted on A-frame leg 190 and has an actuating lever 518 pivotally connected thereto which carries an actuating member 520. A rod 526 extends through an opening in frame member 516 and is connected to actuating member 518 of valve 522 and to lever member 510 adjacent "kick-off" pedal 514. Valve 522 may then be manually actuated "on" and "off" by respective actuation of pedals 512, 514. Valve 522 is also actuated in response to longitudinal movement of the member 128 by a cam plate 524 engaging and actuating roller 520, as will hereinafter be more fully described.

A cycle of operation of the machine is initiated by manual actuation of hand-operated buttons 528, 529 which are also located at the operator's position at the dressing station. Buttons 528, 529 are mounted on the forward side of front frame member 516 and are normally biased upwardly by springs 527 surrounding push rods 537. A member 533 is pivotally mounted, as at 535, on the forward end of lever member 530, which extends through an opening 532 in the front frame member 516. Member 533 is engaged and depressed by downward movement of push rods 537 in response to downward actuation of buttons 528, 529. Lever member 530 is pivotally mounted as at 534 by a bracket assembly 536 suspended from the top plate member 176. A pilot valve 538 is mounted on the A-frame leg 190 and is connected to the actuating lever member 530 by a suitable toggle spring 540 and a rod 542 having a bar 544 connected to its upper end and which is pivotally connected to the lever member 530, as at 546. Thus, downward movement of the lever member 530 in response to manual actuation of both buttons 528, 529 to engage and depress member 533 will cause pivotal movement of rod 542 and in turn actuation of the pilot valve 538 through the spring 540.

As a safety feature, buttons 528, 529 are disposed on either side of a partition member 531, as best seen in FIG. 24B, to insure that the operator uses both hands to actuate the buttons. The pivotal mounting 535 of member 533 requires a straight downward actuation of both buttons 528, 529 in order to actuate lever 530. Actuation of only one of the buttons 528, 529 will merely result in member 533 tilting to one side or the other by reason of its pivotal connection 535 and will not result in initiation of a cycle of operation of the machine.

In order to prevent inadvertent actuation of the lever member 530 during a cycle of operation, a lever member 548 is provided pivotally mounted by means of a rod 550 between a bracket 552 extending rearwardly from the front frame member 516 and another bracket 554 extending inwardly from the side frame member 180 (not shown in FIG. 24). Lever member 548 has pins 556, 558 which selectively engage one or the other of the ends of the bar 544, depending upon the rotational position of the lever member 548. The pivot rod 550 of the lever member 548 has an actuating lever 560 connected thereto having its outer end 562 connected to a rod 564 which in turn is connected to the equalizer bar 156 by a bracket 566. Equalizer bar 156 is shown in the position in which buck 36 is in the dressing position thus moving bar 564 and lever member 560 in the direction shown by the arrow 568 so as to pivot lever member 548 so that the pin 556 engages end 570 of bar 544. When the position of the bucks 34, 36 is reversed thereby causing the equalizer bar 156 to move pivotally in the direction shown by the arrow 572, rod 564 and lever member 560 will be moved in the opposite direction shown by the arrow 574 thereby pivoting lever member 548 in the direction shown by the arrow 576 so as to move the pin 558 into engagement with the other end 578 of the bar 544.

Another lever member 580 is provided pivotally mounted on A-frame leg 190, as at 582, and having its end 584 connected to the bracket 486 on the lever member 250 by a rod 586 (FIG. 23). The point of attachment of rod 586 to the bracket 486 is below the pivotal axis 247 and thus, when the lever member assembly 250 and its pressing head 40 are pivotally moved to the open position, as shown by the arrow 490 (FIG. 23), rod 586 is moved in direction 590 thereby to pivot the hooked end 588 outwardly away from the spring 540, as shown by the arrow 592.

Assuming now that the machine is at rest with the buck 36 in the dressing position and the pressing heads 38, 40 in their open positions, equalizer member 156 will be in the position shown in FIG. 24 with rod 564 and lever member 560 moved forwardly in the direction shown by the arrow 568 and with the lever member 548 pivoted to the position shown with pin 556 in engagement with end 570 of the bar 544. Likewise, end 588 of the lever member 580 will be pivoted outwardly away from the spring 540. In this condition, downward manual actuation of the buttons 528, 529 resulting in downward pivotal movement of the lever member 530 will result in pivotal deflection of the rod 542 in the direction shown by the arrow 594 thereby deflecting spring 540 rearwardly and actuating the toggle of pilot valve 538 to initiate a cycle of operation. Actuation of pilot valve 538, as will be hereinafter described, initiates the reversing movement of the bucks 34, 36, bucks 36 moving rearwardly accompanied by pivotal movement of the equalizer bar 156 in the direction shown by the arrow 572, thereby moving rod 564 and lever member 560 in the direction shown by the arrow 574 and pivoting lever member 548 in the direction shown by the arrow 576 so that the pin 558 is moved into engagement with end 578 of the bar 554 upon completion of the reversal movement. When reversal of the bucks 34, 36 has been accomplished, pad 458 and lever member 454 are actuated, as above-described, to initiate closing of the pressing heads 38, 40. Inward pivotal movement of lever member assembly 250 toward the pressing position results in outward movement of rod 586 and inward pivotal movement of end 588 of the lever member 580 into a position immediately forwardly of the spring 540, thereby preventing a premature subsequent actuation of the pilot valve 538 by another manual actuation of the buttons 528. Upon completion of the programmed timing cycle provided by the timing cylinder 474, the lever member assembly 250 moves pivotally outwardly, as shown by the arrow 490, thereby pivoting the hooked end 588 of the lever member 580 out of its restraining relationship with the spring 540. Now with the other buck 34 in the dressing position, lever member 548 is in its other pivotal position with pin 558 engaging end 578 of the bar 544. In this position, actuation of the buttons 528, 529 will result in pivotal deflection of rod 542 and spring 540 in the direction opposite arrow 594, lever member 548 will be pivoted so that pin 556 will engage end 570 of bar 544, and hooked end 588 of lever member 580 will be pivoted to be in immediate restraining proximity to the spring 540 on the rearward side thereof.

A cam member 596 is mounted on the pivots with the equalizer bar 156, and actuates a valve 598 for a purpose to be hereinafter described.

Operation

Referring now additionally to FIG. 26, it will again be assumed that buck 36 is in the forward dressing position, referred to as the "Out" buck, and that buck 34 is in the rearward pressing position, referred to as the "In" buck, and that the pressing heads 38, 40 are in their open positions. A source 600 of high pressure air is provided having a conventional strainer and filter 602 therein and connected by a high pressure regulator 604 to line 606, regulator 604 reducing the air pressure to a constant desired value, such as 75 p.s.i. Line 606 is coupled to another line 608 in which a low pressure regulator 610 is coupled which reduces the air pressure to a low pressure value, such as 20 p.s.i. Valve 522 is coupled to the low pressure regulator 610 by lines 612, 614 and to transfer valve 616 by line 618. Valve 616 is of the air-piloted, spring-return type. Line 620 connects the valve 616 to the tail clamp and wing cylinders 406, 408 and 426 of buck 36. Line 622 also connects valve 616 to the tail clamp and wing cylinders 406, 408 and 426 of the other buck 34. Line 623 and pressure regulator 626 connect filter 602 to transfer valve 624, lines 628 and 630 connecting valve 624 to the buck cylinders 136 and 138. Transfer valve 624 is of the air-piloted, spring-return type. Pressure regulator 626 reduces the high pressure air to an intermediate pressure, such as 65 p.s.i.

High pressure air line 608 and low pressure air line 612 are both connected to transfer valve 632, valve 632 being connected to valve 616 by line 634 having a conventional differential diaphragm valve 636 therein. Transfer valve 632 is of the air-spring piloted, air-return type. In this condition, valve 632 connects low pressure line 612 to line 634 and thence to valve 616 which, in turn, connects line 634 to line 622 to apply low air pressure to the tail clamp and wing cylinders of the "In" buck 34. In addition, valve 624 couples line 628 to line 627 so that the intermediate pressure air is applied to the "Out" buck cylinder 136.

The operator now dresses a shirt 35 on buck 36 and then actuates the "kick on" pedal 512 of foot pedal 510 which, in turn, causes the spool of valve 522 to shift manually, which connects low pressure air line 614 to line 618, which, in turn, is connected by valve 616 to line 620, thus applying low pressure air to the tail clamp and wing cylinders of the "Out" buck 36 resulting in extension of the wings 382, 384 and movement of the tail clamp 418 into clamping engagement with the shirt. Air may be manually exhausted from valve 522 at any time by actuating the "kick off" pedal 512, thereby to relax the wings and tail clamp of the buck in the dressing position. In addition, as will hereinafter be described in the sequence of operation, air is automatically exhausted from valve 522 by engagement of cam plate 524 with actuating roller 520 whenever the bucks are transferred, thereby relaxing the wings and tail clamps of the buck which is moving to the dressing station so that the pressed shirt may be removed therefrom. Actuation of valve 522 by the "kick on" pedal 512 always sends air to the "Out" buck.

High pressure air line 638 couples regulator 604 to pilot valve 538, lines 640 and 642 coupling pilot valve 538 to transfer valve 616, and lines 640 and 644 coupling pilot valve 538 to transfer valve 624. When the shirt 35 has been dressed upon buck 36 and the wings and tail clamp actuated by foot pedal 510 as above-described, the operator actuates buttons 528, 529 thereby to actuate pilot valve 538 which couples lines 640, 642 and 644 to high pressure line 638, thereby applying high pressure air to the transfer valves 616 and 624 which causes the spools in these valves to shift against springs. Shifting of the spool in valve 624 in response to application of high pressure air from the pilot valve 538 exchanges the flow of air to buck cylinders 136, 138. Thus, shifting of the spool in valve 624 connects line 628 (which is connected to cylinder 136 for the "Out" buck 36) to line 646, which is connected to transfer snubber valve 598, and simultaneously connects line 630 (which is connected to cylinder 138 of the "In" buck 34) to the intermediate pressure line 627, thereby admitting intermediate pressure air to cylinder 138 to initiate reversal of the bucks 36 and 34.

Shifting of the spool of transfer valve 616 exchanges the routing of air to the bucks 34, 36 and thus reverses the connection of lines 620 and 622 so that line 622 which is coupled to the tail clamp and wing cylinders of the "In" buck 34, which is about to be in motion from its pressing position to its dressing position, is now coupled to the valve 522, and the tail clamp and wing cylinders of the "Out" buck 36, which is about to be in motion from the dressing position to the pressing position, are now coupled to low pressure lines 634 and 612 by valve 632. Valve 522 is of the snap-acting type and movement of cam plate 524 associated with buck 36 toward its pressing position engages roller 520 to actuate valve 522 thereby to release the low pressure air on the tail clamp and wing cylinders of buck 34 when it reaches its forward dressing position. At this point, the exchange of bucks and the accompanying automatic sequence has been initiated.

Snubber valve 598, which is actuated by the arcuate cam 596 operated by the equalizer bar 156, has a metered exhaust 648 and an unrestricted exhaust 650. Cylinder 136 for buck 36 is retracted in three stages by virtue of the connection of line 628 to line 646 and snubber valve 598 by the transfer valve 624. When reversal of the bucks 36 and 34 is initiated, thus initiating retraction of cylinder 136 and extension of cylinder 138 for buck 34, valve 598 connects line 646 to the unrestricted exhaust 650. After a part of the retraction travel of cylinder 136 of buck 36 accompanied by pivotal motion of equalizer bar 156 in direction 572 (FIG. 24), cam 596 actuates snubber valve 598 so as to connect line 646 to the metered exhaust 648 thereby to provide a snubbing action for the cylinder 136 as its piston approaches the "In" position. Finally, adjacent the end of the retraction stroke, the cam 596 moves off of the actuating connection with the snubber valve 598 so that the unresrticted exhaust 650 is again coupled to line 646 in order to blowdown the cushion of air and to eliminate bounce, thus to seat buck 36 firmly in the "In" position.

At this time in the cycle, the two bucks have been completely reversed in position, buck 34 moving forwardly to the dressing or "Out" position and buck 36 moving rearwardly to the pressing or "In" position. As the "In" buck 34 started to move toward the "Out" position, pressure on pad 458 and arm 454 was relaxed and thus, spring 464 moved rod 462 and member 451 in direction 466 thereby causing the knees 447, 449 of the knuckle arms 446, 448 to straighten and retracting actuating rods 442, 444 of control valves 436, 438 (FIG. 23). When buck 36 reaches its inward extreme pressing or "In" position, its base plate member 350 engages the pad 458 of the pivoted lever member 454 which simultaneously actuates both of the control valves 436 and 438, i.e., rod 462 and member 451 move in direction 472 causing the rigid "knees" 447, 449 to push in on actuating rods 442, 444, thus manually shifting the spools of valves 436, 438.

Line 652 connects the high pressure line 606 to head closing valve 436. Line 654 and line 656 connect valve 436 to transfer valve 632, and line 654 and line 658 connect valve 436 to head opening snubber valve 438. Line 660 connect valve 438 to the inlet port 348 of the hollow piston rod 276 of the pressing head cylinder 272. Lines 654 and 662 connect valve 436 to the timing cylinder 474 through pressure regulator valve 664. Thus, actuation of head closing control valve 436 admits high pressure air from line 606 through line 652, line 654 and 658, and the simultaneous actuation of head opening snubber control valve 438 admits high pressure air through line 660 to the hollow piston rod 276 of the head cylinder 272 which accordingly extends to cause the lever member assemblies 250, 252 and pressing heads 38, 40 to close rapidly and sufficiently to cause the heads to touch the "In" buck 36 before the functions of valve 632 are initiation. Actuation of valve 436 also admits high pressure air to line 662 and to the timing cylinder 474 to initiate the timing cycle.

Referring additionally to FIG. 13, it will observed that spring 278 is connected to the left lever member 250 at point 279 which is closer to the pivot point 262 of that lever member than is the point of connection 281 of spring 280 with the right lever member 252. It will also be observed in FIG. 1 that the shirt 35 is dressed on the respective buck 34, 36 with its front, i.e., its buttoned side facing the left pressing head 40 (as viewed in FIG. 13). Recalling now that cylinder 272 is floating, i.e., supported by the lower ends 256 of the lever member 250, 252, spring 278, by reason of its connection to lever member 250 at point 279 closer to pivot point 262, will offer less resistance to movement of lever member 250 than spring 280 offers to movement of lever member 252. Resultantly, the left head 40 will engage and trap the front of the shirt 35, with its buttons, before the right head 38 engages the back side of the shirt and before the high pressure is applied, as will directly be described, thus permitting the back panel of the shirt to slide on the "In" buck when high pressure is applied to its wings.

Actuation of head closing control valve 436 also couples lines 654 and 656 to transfer valve 632 admitting high pressure air thereto through needle valve 657 which meters the high pressure air to valve 632, thus giving priority to the air going to the hollow piston rod 276 so as to close the heads rapidly. Valve 632 controls the timing of the shift from low to high pressure on the wings and clamp of the "In" buck, this shift being accomplished in response to pressure differential. Valve 632 is of the balanced type and when the pressure of the air admitted thereto by metering needle valve 657, assisted by a spring, balances the high pressure air admitted thereto from line 608 through connection 666, the internal spring (not shown) causes the spool of valve 632 to shift so that high pressure air line 608, 666 is now coupled to line 634, which was previously coupled by transfer valve 616 to line 620 and the tail clamp and wing cylinders of the now "In" buck 36, thereby to stretch the shirt taut on the "In" buck 36 during the pressing operation.

High pressure line 606 is also coupled by line 607 to high pressure head valve 668 which is of the air-piloted, spring-return type. The high pressure air in line 607 normally holds the spool of valve 668 against a spring (not shown) so that valve 668 normally couples line 607 to both parts 344 and 346 of head cylinder 272, the large cylinder 334 thus being normally filled with high pressure air. It will be observed that when the hollow piston rod 276 moves outwardly in the direction shown by the arrow 270 in FIG. 25, in response to application of high pressure air to port 348 through control valves 436 and 438, as above-described, there is no contact between the large piston 336 and the wall of the large cylinder 334 until the large piston 336 comes into sealing contact with the reduced-diameter wall portion 340 adjacent the end of its stroke.

The hollow piston rod 276 has now closed the heads 38, 40, also moving the large piston 336 into sealing contact with the reduced-diameter wall portion 340 of large cylinder 334, and pressure has built up through needle valve 657 sufficiently to cause the spool of valve 632 to shift to supply high pressure air to line 534 and valve 616, and in turn to the wings and clamp of the "In" buck 36. Valve 616 also couples line 634 and differential valve 636 to line 667, which is coupled to valve 668 and thus, applies low pressure air to valve 668 prior to shifting of the spool in valve 632. However, when the spool in valve 632 shifts, valve 616 now applies high pressure air to valve 668. This high pressure air applied by line 667 from valve 616, added to the internal spring pressure, overcomes the high pressure air applied to valve 668 by line 607, causing the spool of that valve to shift.

Shifting of the spool of valve 668 connects port 346 to metered exhaust 672 thereby to exhaust the air in the reduced-diameter portion 340 of the large cylinder 334. However, air is exhausted from only one side of the large piston 336 by reason of its sealing contact with the reduced-diameter wall portion 340, port 344 remaining connected to high pressure line 607 thus applying full pressure to the other side of large piston 336 so that a greatly increased squeezing force is exerted on the lever members 250, 252 and heads 38, 40.

Air from valve 436 also passes through line 654 and 662, pressure regulator 664, and orifice 665 to the timing cylinder 474 which slowly extends its piston rod 476 upward. Pressure regulator 664, which reduces the air pressure to around 5 p.s.i., and orifice 665 selectively adjust the time required for extension of piston rod 476 of timing cylinder 474, i.e., the length of time the heads will be closed to press the shirt.

Upon completion of the pressing time, i.e., when the piston rod 476 of the timing cylinder 474 is fully extended, all systems return to neutral as will now be described. Piston rod 476 of timing cylinder 474, when fully extended, breaks the knee 449 of the knuckle arm 448 thereby permitting the spool of the valve 436 to be shifted to its normal position by its internal spring (not shown). Shifting of the spool of valve 436 to its normal position opens exhaust port 681 permitting air from the timing cylinder 474 to exhaust directly through line 680, thus bypassing orifice 665, and thereby providing quicker return of piston rod 476. The connection of high pressure line 652 to line 654 is also broken thus removing high pressure air from the hollow piston rod 276 (via line 658, valve 438 and line 660) and from transfer valve 632 (via line 656), and exhaust port 683 is also opened, being now coupled to line 654, thus permitting quick exhaust of air from the hollow piston rod 276 through line 348, valve 438 and line 658, as hollow piston rod 276 is moved toward its retracted position.

Valve 632 is now also coupled to exhaust 683 by lines 656 and 654, needle valve 657 bleeding the high pressure air from valve 632 until the combined force exerted on the spool by the reduced air pressure and the spring is below that exerted by the high pressure air in line 666, whereupon the spool of valve 632 is shifted back to its normal position by the high pressure air in line 666, thereby again coupling low pressure air line 612 to line 634 and diaphragm valve 636. At this instant, high pressure is still present in the wing and tail cylinders 406, 408 and 426 of the "In" buck 36, and in line 667 connected to valve 668, this high pressure being exerted on one side of diaphragm valve 636 while low pressure is exerted on the other by line 634. The high pressure on the diaphragm valve 636 then exhausts through metered exhaust 637 until pressure on both sides of the diaphragm of valve 636 is equalized, i.e., at the low pressure of line 634. Then, the wings and tail clamp on the pressed shirt on the "In" buck 36 are still extended, but at the low air pressure in line 634.

As the high pressure on diaphragm valve 636 is thus exhausted through metered exhaust 637, the pressure applied by line 667 to valve 668 reduces and when the combined pressure in line 667 and the force exerted on the spool in valve 668 by the internal spring falls below the high pressure air applied thereto by line 607, the spool of valve 668 will be shifted back to its normal position. Shifting of the spool of valve 668 back to its normal position disconnects port 346 from exhaust 672 and connects it again to high pressure line 607 so that the pressure on both sides of the large piston 336 is equalized. Springs 278, 280 will now start to move lever members 250, 252 and heads 38, 40 toward their open position, the small piston rod exhausting initially through exhaust port 681 in valve 436 as abovedescribed. However, movement of lever member assembly 250 toward its open position causes roller 494 on lever 492 to engage lever member 480 so that end 484 is raised to break the knee 447 of knuckle arm 446 (FIG. 23), the spring in valve 438 thus returning its spool to its normal position. Shifting of the spool of valve 438 back to its normal position breaks the connection of line 660 to lines 658 and 654, and now connects line 660 to metered exhaust 678. Thus the exhaust for the hollow piston rod 276 is diverted from exhaust port 681 of valve 436 to metered exhaust 678 of valve 438 which serves to snub the opening of lever members 250, 252 and heads 38, 40 as the hollow piston rod 276 slowly completes its return to its fully retracted position.

Upon return of lever members 250, 252 and heads 38, 40 to their fully open position, it will be observed that the conditions prevailing at the start of the cycle of operation have been restored with, however, the positions of the two bucks being reversed, i.e., buck 34 is now the "Out" buck at the dressing station. As above described, movement of buck 36 toward the "In" position caused cam plate 524 to trip valve 522 removing the low pressure air from the wings and clamp of the "Out" buck 34 to permit removal of the pressed shirt therefrom, low pressure air is applied by valve 632, line 634, valve 616 and line 620 to the wings and tail clamp of the "In" buck 36, the spools of valves 436, 438 and 668 are in their normal positions, and high pressure air is applied by line 607 to both ports 344 and 346 of the head cylinder 272.

Employment of a completely pneumatic control and programming system is desirable since a source of air is necessary for actuation of the power cylinders in any event, and thus no electrical system whatsoever is required for the machine. However, it will be readily understood that any electrical control and programming system may be employed in lieu of the pneumatic control and programming system illustrated and described.

While there have been described above the principles of this invention in connection with specific apparatus, it is to be clearly understood that this description is made only by way of example and not as a limitation to the scope of this invention.

We claim:

1. In a pressing machine, a frame including a portion defining a base plane, a pair of pressing bucks which are respectively upright with respect to said base plane, first means for mounting one of said bucks on said frame for movement between first and second positions in a first arcuate path lying a first plane which defines an angle with said base plane, and second means for mounting the other of said bucks on said frame for movement between third and fourth positions in a second arcuate path lying in a second plane which defines an angle with said base plane and with said first plane, said first and second mounting means being respectively disposed with respect to said frame portion so that said first and second paths intersect at first and second points spaced-apart along a line lying in a third plane which is normal to said base plane and are spaced-apart intermediate said points, said first and third buck positions being substantially coincident at said first point and said second and fourth buck positions being substantially coincident at said second point.

2. The machine of claim 1 wherein said first and second mounting means are further respectively disposed with respect to said frame portion so that said first and second planes respectively interesect said base plane along second and third lines defining an angle therebetween in said base plane, said first-named line defining an angle in said third plane with respect to said base plane whereby said second point and second and fourth buck positions are spaced from said base plane by a greater distance than said first point and said first and third buck positions.

3. The machine of claim 1 further comprising means for simultaneously moving said bucks in opposite directions between said positions thereof.

4. The machine of claim 1 further comprising a pair of pressing heads which are respectively upright with respect to said base plane and respectively disposed on opposite sides of said third plane, said second and fourth buck positions being between said second point and said heads, and means for selectively moving said heads into pressing engagement with a said buck therebetween.

5. The machine of claim 1 wherein said first and second mounting means are further respectively disposed with respect to said frame portion so that said first and second planes define substantially equal angles with said third plane on opposite sides thereof and define substantially equal angles with said base plane.

6. The machine of claim 5 wherein said first and second mounting means are further respectively disposed with respect to said frame portion so that said first and second planes respectively intersect said base plane along second and third lines respectively defining substantially equal angles with said third plane in said base plane, said first-named line defining an angle in said third plane with said base plane whereby said second point and said second and fourth buck positions are spaced from said base plane by a greater distance than said first point and said first and third buck positions, said first and third buck positions being at a dressing location and said second and fourth buck positions being at a pressing location, and further comprising means mounted on said frame and connected to said mounting means for simultaneously moving said bucks in opposite directions between said positions thereof, a pair of pressing heads at said pressing location which are respectively upright with respect to said base plane and respectively disposed on opposite sides of said third plane, said second point and second and fourth buck positions being between said heads, and means mounted on said frame and connected to said heads for simultaneously moving the same transversely of said third plane between first positions spaced from a buck in said pressing location and second positions in pressing engagement with a buck in said pressing location.

7. The machine of claim 1 wherein said first and second mounting means are respectively pivotally mounted on said frame.

8. The machine of claim 7 wherein said first and second mounting means respectively comprise elongated members having inner ends pivotally connected to said frame and outer ends pivotally connected to said bucks, said outer ends respectively lying in and moving in said arcuate paths in said first and second planes.

9. The machine of claim 7 wherein each of said mounting means comprises a pair of elongated parallel members respectively having inner ends pivotally connected to said frame and outer ends pivotally connected to the respective buck, said outer ends of said pair of members respectively lying in and moving in said arcuate paths in said first and second planes.

10. The machine of claim 1 wherein said frame means includes a pair of bearing members respectively lying in fourth and fifth planes respectively parallel with said first and second planes, said first and second mounting means respectively comprising elongated members having inner ends pivotally connected to said bearing members and outer ends pivotally connected to said bucks, said outer ends respectively lying in and moving in said arcuate paths in said first and second planes.

11. The machine of claim 10 wherein said fourth and fifth planes are respectively spaced from said first and second planes, said elongated members respectively defining substantially equal angles with said first and fourth and said second and fifth planes.

12. The machine of claim 11 wherein said elongated members are substantially upright and in transverse alignment at one point during their respective movement between said buck positions.

13. The machine of claim 12 wherein said bearing members are on opposite sides of said third plane and respectively define substantially equal angles with said base plane.

14. The machine of claim 13 wherein said bearing members also define substantially equal angles with said third plane.

15. In a pressing machine, a frame including a horizontally disposed base portion having a longitudinal axis, a pair of upright pressing bucks spaced above said base portion, a first pair of longitudinally spaced-apart arms respectively having lower ends pivotally connected to said base portion at a first pair of points on one side of said axis and having upper ends pivotally connected to one of said bucks, and a second pair of longitudinally spaced-apart arms respectively having lower ends pivotally connected to said base portion at a second pair of points respectively transversely spaced from said first pair of points on the other side of said axis and having upper ends pivotally connected to the other of said bucks, said pairs of arms being respectively pivotally movable thereby respectively to move said bucks in two arcuate paths between first and second longitudinally spaced-apart positions, at least one of said buck positions being substantially in vertical alignment with said axis, said bucks being transversely spaced-apart intermediate said first and second positions thereof.

16. The machine of claim 15 wherein both said first and second buck positions are substantially in vertical alignment with said axis, said second buck positions being vertically spaced above said base portion by a distance greater than that of said first buck positions.

17. The machine of claim 15 wherein said first and second pairs of points respectively lie on lines which diverge from and define equal angles with said axis.

18. The machine of claim 15 wherein said base portion includes a pair of longitudinally extending plate members transversely spaced-apart on opposite sides of said axis, said plate members being divergently inclined upwardly and outwardly transversely of said axis, said first and second pairs of arms respectively having said lower ends thereof pivotally connected to said plate members, said plate members also respectively diverging from and defining equal angles with said axis.

19. In a pressing machine, a frame including a base portion, a pair of upright pressing bucks spaced from said base portion, first means for mounting one of said bucks on said base portion for pivotal movement in a first arcuate path lying in a first plane between first and second longitudinally spaced positions, and second means for mounting the other of said bucks on said base portion for pivotal movement in a second arcuate path lying in a second plane between third and fourth longitudinally spaced positions, said first and second mounting means being disposed with respect to said base portion so that said paths substantially coincide at their extremities and said first and second planes respectively define angles with said base portion and with each other whereby said paths are transversely spaced-apart between said extremities.

20. The machine of claim 19 wherein said frame has a longitudinal axis, said first and third buck positions being at a dressing station and said second and fourth buck positions are at a pressing station, at least said pressing station being substantially in vertical alignment with said axis, and further comprising a pair of pressing heads at said pressing station and respectively on opposite sides of said axis, said second and fourth buck positions being between said heads, and a pair of lever members respectively connected to said heads for moving both of said heads transversely of said axis between an open position in pressing engagement with a said buck in said second position thereof.

21. The machine of claim 20 wherein said lever members respectively have upper and lower ends, said lever members being pivotally mounted on said frame intermediate said ends for pivotal movement transversely of said axis, said upper ends being respectively connected to said heads, and further comprising actuating means connected to the lower ends of said lever members for pivotally moving the same.

22. The machine of claim 21 wherein said actuating means comprises fluid cylinder means interconnecting and supported by said lower ends of said lever members.

23. The machine of claim 20 wherein said frame has a forward end adjacent said dressing station and a rear end adjacent said pressing station, said lever members being mounted for pivotal movement about parallel pivot axes which are respectively on opposite sides of and parallel with said longitudinal axis and which are inclined forwardly and downwardly toward said forward end of said frame.

24. The machine of claim 20 wherein said heads are respectively pivotally connected to said lever members, and further comprising means respectively connected to said heads for pivotally moving the same between a parallel relationhip when said heads are in said closed position thereof and a relationship diverging from said axis in the direction of said dressing station when said heads are in said open position.

25. The machine of claim 20 wherein said frame has forward and rear ends, said frame having an upstanding portion with transversely spaced side legs parallel with said axis and defining an opening at said forward end, said dressing station being forwardly of said opening, said pressing station being between said side legs and said arms moving therebetween, said lever members respectively having upper and lower ends and being pivotally mounted intermediate said ends on said side legs for pivotal movement transversely of said axis about parallel pivot axes which are inclined forwardly and downwardly toward said forward end, said upper ends of said lower members being respectively pivotally connected to said heads, and further comprising first actuating means on said base portion of said frame and operatively connected to said first and second mounting means for simultaneously pivotally moving the same in opposite directions between said buck positions, second actuating means interconnecting said lower ends of said lever members and supported thereby for pivotally moving the same, and means respectively connected to said heads and said side legs for pivotally moving said heads between a parallel relationship when said heads are in said closed position thereof and a relationship diverging from said axis toward said forward end when said heads are in said open position.

26. The machine of claim 25 wherein said first actuating means comprises a first fluid cylinder operatively connected to said first mounting means, a second fluid cylinder operatively connected to said second mounting means, and an equalizer member pivotally mounted on said base portion and having opposite ends respectively connected to said first and second mounting means, and wherein said second actuating means comprises fluid cylinder means having a cylinder connected to said lower end of one of said lever members and a piston connected to said lower end of the other of said members.

27. The machine of claim 25 wherein said second actuating means includes springs means interconnecting said lever members and normally urging the same to move said heads to their open position, and equalizer means interconnecting said lever members.

28. The machine of claim 25 wherein said heads are respectively pivotally connected to said upper ends of said lever members for pivotal movement about two axes, one of said axes being substantially parallel to said pivot axes of said lever members and the other being substantially normal thereto.

29. The machine of claim 20 further comprising fluid cylinder means interconnecting said lever members for actuating the same between said open and closed positions thereof, said fluid cylinder means comprising a first enlarged cylinder having a side wall and opposite end walls, a hollow piston rod having an open inner and a closed outer end and forming a smaller cylinder, said hollow piston rod being mounted in one of said enlarged cylinder end walls for protractile and retractile movement therein with said open end disposed in said enlarged cylinder, a fixed piston in said hollow piston rod and connected to the other of said enlarged cylinder end walls, another piston in said enlarged cylinder and mounted on said hollow piston rod adjacent said open end, said other end wall being connected to one of said lever members and said hollow piston rod having said outer end thereof connected to the other of said lever members, first means for selectively admitting fluid under pressure to said hollow piston rod between said outer end and said fixed piston thereby to cause initial protractile movement of said hollow piston rod to initiate movement of said heads toward said closed position with a first predetermined force, and second means for selectively admitting fluid under pressure to said enlarged cylinder between said other end wall and said other piston for completing movement of said heads to said closed position with additional force when said other piston reaches a predetermined point adjacent said one end wall.

30. The machine of claim 29 wherein said enlarged cylinder sidewall has a first constant diameter portion extending from said other end wall to said point, said other piston having a clearance with said first side wall portion, said second means including a second reduced diameter portion on said enlarged cylinder side wall extending from said one end wall to said point, said other piston having a sealing relationship with said second portion.

31. The machine of claim 30 wherein said first means includes first valve means and means for actuating the same in response to movement of a said buck to said second position thereof to couple a source of fluid under pressure to said hollow piston rod, said enlarged cylinder having a first port communicating therewith between said one end wall and said point, said second means including a second port communicating with said enlarged cylinder between said other end wall and other piston, and second valve means for normally coupling said source to both of said ports, said second valve means including means for disconnecting said source from said first port and for coupling the same to exhaust means when said other piston reaches said point.

32. The machine of claim 20 further comprising fluid cylinder means interconnecting said lever members for actuating the same between said open and closed positions, means for admitting fluid under pressure to said cylinder means in response to movement of a buck to said second position thereof, and timing means for deactuating said admitting means after a predetermined time.

33. The machine of claim 31 further comprising spring means coupled to said lever members and normally urging the same to move said heads to their open position, timing fluid cylinder means for deactuating said first and second valve means after a predetermined time delay, and means for admitting fluid under pressure to said timing cylinder means in response to movement of a said buck to said second position thereof.

34. The machine of claim 19 further comprising first and second fluid cylinders respectively operatively connected to said first and second mounting means for respectively pivotally moving the same from one of said buck positions to the other, mans coupled to said first and second mounting means for respectively pivotally moving the same from said other to said first buck position, and valve means for selectively coupling one of said cylinders to a source of fluid under pressure thereby pivotally to move the respective mounting means from said one to said other buck position, and for simultaneously coupling the other of said cylinders to metering exhaust means whereby said moving means moves said other mounting means from said other to said first position with said metering means snubbing said other cylinder.

35. The machine of claim 34 wherein said moving means comprises an equalizer member interconnecting said first and second mounting means and pivotally mounted on said frame.

36. The machine of claim 19 wherein said first and third buck positions are at a dressing station and said second and fourth buck positions are at a pressing station, and further comprising selectively actuable means on each of said bucks for retaining a garment thereon, first and second fluid cylinder means respectively operatively connected to said retaining means for actuating the same, one of said bucks normally being at said dressing station and the other at said pressing station, third and fourth fluid cylinder means respectively operatively connected to said first and second mounting means for simultaneously moving said bucks in opposite directions between said stations, a pair of heated pressing heads at said pressing station and selectively actuable between an open position and a closed position in pressing engagement with a said buck at said pressing station, fifth cylinder means operatively connected to said heads for actuating the same to said closed position, a first source of fluid under relatively high pressure, a second source of fluid under relatively low pressure, first and second selectively actuable transfer valve means, said first valve means having an outlet coupled to one inlet of said second valve means and including transfer means having a first position connecting said second source to said outlet and a second position connecting said first source to said outlet, said second valve means having two outlets respectively coupled to said first and second cylinders, first manually actuated valve means for selectively coupling said second source to another inlet of said second valve means, said second valve means including transfer means having a first position connecting said one inlet to one of said outlets and said other inlet to the other of said outlets, and having a second position reversing said connections, a second manually actuated valve means coupled to said second valve means for selectively actuating said tranfer means thereof between said first and said second positions thereof, said second manually actuated valve means being coupled to said third and fourth cylinder means for selectively actuating the same to reverse the position of said bucks, control valve means for selectively actuating said fifth cylinder means, and means for actuating said control valve means in response to movement of a said buck to said pressing station, said control valve means being coupled to said first transfer valve means for actuating said transfer means thereof to said second position whereby said first source is coupled to the respective first and second cylinder means of said buck at said pressing station.

37. The machine of claim 36 further comprising timing means actuated by said control valve means for deactuating the same after a predetermined time.

38. The machine of claim 36 further comprising means for actuating said first manually actuated valve means to decouple said second source from said other input of said second valve means in response to movement of one of said bucks to said dressing station.

39. The machine of claim 19 wherein each of said first and second mounting means includes an elongated arm having a lower end pivotally connected to said base portion and an upper end pivotally connected to the respective buck, and means for retaining the respective buck upright at its respective positions.

40. The machine of claim 39 further comprising over-center spring means respectively connected to said arms for normally retaining the same in either of said buck positions.

References Cited

UNITED STATES PATENTS

| | | | |
|---|---|---|---|
| 2,854,177 | 9/1958 | Strike et al. | 223—57 |
| 2,966,288 | 12/1960 | Nancarrow | 223—57 |
| 3,070,268 | 12/1962 | Carpenter | 223—57 |
| 3,384,347 | 5/1968 | Lornitzo | 223—57 |

FOREIGN PATENTS

| | | |
|---|---|---|
| 1,399,566 | 4/1965 | France. |

MERVIN STEIN, Primary Examiner

GEORGE V. LARKIN, Assistant Examiner

UNITED STATES PATENT OFFICE
CERTIFICATE OF CORRECTION

Patent No. 3,463,367                                                            August 26, 1969

Rollin E. Campbell et al.

It is certified that error appears in the above identified patent and that said Letters Patent are hereby corrected as shown below:

Column 5, line 4, "stations" should read -- positions --. Column 7, line 23, after "end" insert -- 256 of --. Column 10, line 31, "pivotally" should read -- pivoting --. Column 11, line 26, "valves" should read -- valve --. Column 15, line 12, "connect" should read -- connects --; line 25, "initiation" shou read -- initiated --; line 72, "parts" should read -- ports --. Column 18, lines 26 to 28 should read -- opposite sides of said third plane, said second point and said second and fourth buck positions being between said --. Column 20, lines 15 and 16, after "open position" insert -- and a closed position --; line 56, "lower" should read -- lever --. Column 22, line 15, "mans" should read -- means --.

Signed and sealed this 15th day of September 1970.

(SEAL)
Attest:

EDWARD M. FLETCHER, JR.                                  WILLIAM E. SCHUYLER, JR
Attesting Officer                                               Commissioner of Patents